(12) United States Patent
Qazi et al.

(10) Patent No.: US 12,543,986 B2
(45) Date of Patent: Feb. 10, 2026

(54) SMART ELECTRODES FOR SENSING SIGNALS AND PROCESSING SIGNALS USING INTERNALLY-HOUSED SIGNAL-PROCESSING COMPONENTS AT WEARABLE DEVICES AND WEARABLE DEVICES INCORPORATING THE SMART ELECTRODES

(71) Applicant: Meta Platforms Technologies, LLC, Menlo Park, CA (US)

(72) Inventors: Raza Qazi, Jackson Heights, NY (US); Jeremy Wurmlinger, Morristown, NJ (US); Yue Yin, Milpitas, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 314 days.

(21) Appl. No.: 18/174,590

(22) Filed: Feb. 24, 2023

(65) Prior Publication Data

US 2023/0270363 A1  Aug. 31, 2023

Related U.S. Application Data

(60) Provisional application No. 63/387,278, filed on Dec. 13, 2022, provisional application No. 63/413,937,
(Continued)

(51) Int. Cl.
*A61B 5/25* (2021.01)
*A61B 5/00* (2006.01)
*A61B 5/256* (2021.01)

(52) U.S. Cl.
CPC .............. *A61B 5/25* (2021.01); *A61B 5/0006* (2013.01); *A61B 5/256* (2021.01); *A61B 2562/125* (2013.01)

(58) Field of Classification Search
CPC .......... A61B 5/25; A61B 5/256; A61B 5/0006; A61B 2562/125; A61B 5/681
See application file for complete search history.

(56) References Cited

U.S. PATENT DOCUMENTS 10,874,348 B1 * 12/2020 Han ................... A61B 5/6843
11,116,448 B1 * 9/2021 Trapero Martin ... A61B 5/0816
(Continued)

OTHER PUBLICATIONS

International Search Report and Written Opinion for International Application No. PCT/US2023/013946, mailed Jun. 2, 2023, 9 pages.
(Continued)

*Primary Examiner* — Adam Z Minchella
(74) *Attorney, Agent, or Firm* — Morgan, Lewis & Bockius LLP

(57) ABSTRACT

Smart electrodes are described herein. An example smart electrode includes a conductive exterior surface configured to contact skin of a user to receive one or more neuromuscular signals, the one or more neuromuscular signals configured to cause the user to perform a muscular movement. The smart electrode has an interior surface defining a volume of space configured to house one or more electrical signal-processing components, the one or more electrical signal-processing components configured to process the one or more neuromuscular signals to produce one or more processed neuromuscular signals. The electrical signal-processing components housed within the volume of space defined by the interior surface of the dry electrode are also configured to provide the processed neuromuscular signals to one or more processors to allow, in part, the one or more processors to detect the user's intention to perform the muscular movement.

20 Claims, 21 Drawing Sheets

Related U.S. Application Data filed on Oct. 6, 2022, provisional application No. 63/413,935, filed on Oct. 6, 2022, provisional application No. 63/314,213, filed on Feb. 25, 2022.

(56) References Cited

U.S. PATENT DOCUMENTS

| | | | |
|---|---|---|---|
| 2015/0173639 A1* | 6/2015 | Ichida | A61N 1/0472 600/397 |
| 2015/0234426 A1 | 8/2015 | Bailey et al. | |
| 2017/0020449 A1* | 1/2017 | Shim | A61B 5/6898 |
| 2017/0181644 A1* | 6/2017 | Meer | G06F 3/011 |
| 2017/0265780 A1* | 9/2017 | Lee | A61B 5/681 |
| 2018/0085580 A1* | 3/2018 | Perez | A61N 1/0456 |
| 2019/0072912 A1* | 3/2019 | Pandya | G04G 21/025 |
| 2019/0192037 A1* | 6/2019 | Morun | H05K 1/162 |
| 2019/0231235 A1* | 8/2019 | Jeong | A61B 5/725 |
| 2019/0365318 A1 | 12/2019 | Guo et al. | |
| 2020/0022606 A1 | 1/2020 | Barbre et al. | |
| 2020/0337640 A1 | 10/2020 | Jeon et al. | |
| 2021/0186336 A1 | 6/2021 | Bellifemine et al. | |
| 2021/0378571 A1 | 12/2021 | King et al. | |
| 2022/0015663 A1* | 1/2022 | Obie | A61B 5/0531 |

OTHER PUBLICATIONS

Song W., et al., "Design of a Flexible Wearable Smart sEMG Recorder Integrated Gradient Boosting Decision Tree Based Hand Gesture Recognition," IEEE Transactions on Biomedical Circuits and Systems, vol. 13, No. 6, Dec. 1, 2019, pp. 1563-1574.

International Preliminary Report on Patentability for International Application No. PCT/US2023/013946, mailed Sep. 6, 2024, 7 pages.

Non-Final Office Action mailed Sep. 26, 2025 for U.S. Appl. No. 18/174,594, filed Feb. 24, 2023, 16 pages.

* cited by examiner

SMART ELECTRODES FOR SENSING SIGNALS AND PROCESSING SIGNALS USING INTERNALLY-HOUSED SIGNAL-PROCESSING COMPONENTS AT WEARABLE DEVICES AND WEARABLE DEVICES INCORPORATING THE SMART ELECTRODES

RELATED APPLICATIONS

This application claims priority from U.S. Provisional Application No. 63/314,213, filed Feb. 25, 2022; U.S. Provisional Application No. 63/413,937, filed Oct. 6, 2022; U.S. Provisional Application No. 63/413,935, filed Oct. 6, 2022; and U.S. Provisional Application No. 63/387,278, filed Dec. 13, 2022, each of which is incorporated by reference herein in their respective entireties.

TECHNICAL FIELD

The present disclosure relates generally to active-embedded dry bio-electrodes configured to sense neuromuscular signals of a user (e.g., dry electrodes that internally house signal-processing components used to process neuromuscular signals rather than having those signal-processing components be separate and apart from the electrode) and, more particularly, to wrist-worn-wearable devices that include one or more of the active-embedded dry bio-electrodes.

BACKGROUND

Some wearable devices include sensors for sensing neuromuscular signals (e.g., surface electromyography signals) to allow the devices to predict motor actions a user intends to perform. These sensors can have different performance variances based on a variety of factors, including, e.g., demographic factors, such as age, body fat, hair density, skin moisture, tissue composition, anthropometric wrist variation (static), and anthropometric wrist variation during gesture (e.g., dynamic). The performance variances based on this variety of factors are not well understood in the art, which can create a number of challenges in designing wearable devices that can accurately sense neuromuscular signals, while also ensuring that the device has a socially acceptable form factor and can be built using a fewer number of component parts. Current designs of wearable devices for sensing neuromuscular signals can be large and bulky, often including a large number of sensors to detect neuromuscular signals (and often including components used for electromagnetic shielding that can further exacerbate the bulkiness issues). The large and bulky wearable devices can be uncomfortable to a user and can also make the devices less practical and less socially acceptable for day-to-day use.

In addition, processing of raw neuromuscular signals received at electrodes can be delayed by the need to send the raw neuromuscular signals to separate signal-processing components for further processing, which can result in delayed gesture recognition (e.g., recognition of in-air pinch gestures in which a user's thumb contacts or intends to contact another of the user's digits). Any delay is undesirable, especially for the new paradigms of in-air gestures, with which many users are unfamiliar and might decline to adopt if gesture-recognition latency is too significant and frustrates their interactions with wearable devices.

Some designs also rely on wet-electrodes, which is undesirable, especially for consumer products, and would further frustrate consumer adoption of the new in-air gesture space if they needed to apply an electrode gel in order to make the systems function properly.

Furthermore, some designs also rely on uncomfortable structures to be placed against the skin of a user, which is also undesirable, especially for consumer products that are intended to be worn for extended periods of time.

In addition, conventional designs tend to have single-purpose electrodes that are configured to detect a single signal, which is not ideal, as reducing the amount of uncomfortable contact points is desirable for consumer-grade products worn for extended periods.

As such, there is a need to address one or more of the drawbacks discussed above.

SUMMARY

An example wearable device for sensing neuromuscular signals described herein makes use of improved active-embedded dry bio-electrodes configured to sense neuromuscular signals associated with muscle movements (e.g., movement of muscles responsible for coordinating movement of a user's wrist, hand, digits, etc.) from a user. These dry bio-electrodes are referred to as active-embedded, in some embodiments, because the electrode is configured to internally house components for processing the neuromuscular signals that were sensed at an external surface of the bio-electrode. Including electrical signal-processing components within an interior surface of the dry electrode further reduces latency in processing. By having the electrical signal-processing components within an interior surface of the dry electrode, the raw signals are passed right to the signal-processing components, which thereby reduces latency for processing and classifying in-air gestures. These improvements enable better user acceptance and adoption of new in-air hand gestures, as the user need not wait for the device to process each in-air gesture, which would result in frustrating experiences causing users to avoid adopting the new in-air hand gestures. Moreover, including the electrical signal-processing components improves reliability of the product, as having less cabling (e.g., cabling from the electrode to external signal-processing components) in a product that sees a lot of movement (e.g., a watch wristband) is preferred and leads to fewer points of failure in a product that consumers depend on for second-to-second reliability.

While the primary example utilized herein describes use of the active-embedded bioelectrodes for sensing and partial processing of neuromuscular signals, that is just one example, and a skilled artisan upon reviewing the descriptions and figures provided here will understand that the active-embedded bioelectrodes can be designed to sense any of a number of different biopotential signals, including electromyography/EMG, electrocardiogram/ECG, electroencephalography/EEG, and electrooculography/EOG signals. Some systems can make use of active-embedded bioelectrodes with multiple different types of devices (e.g., active-embedded bioelectrodes associated with a wrist-wearable device for detecting EMG signals and/or ECG signals, and other active-embedded bioelectrodes associated with a head-worn wearable device (e.g., Augmented Reality (AR) smart-glasses or Virtual Reality (VR) goggles) for detecting EMG and/or EEG signals, including smart-glasses having electrodes placed near a user's auricular muscles, or other facial muscles, such that the examples provided herein apply to smart electrodes positioned to detect muscle activations that can be used to control the wearable device directly or another device associated therewith). Additionally, in certain embodiments or circumstances, these improved dry electrodes can also be modularly designed to allow them to detect one or multiple different types of biometric signals. Having the ability to customize these dry electrodes to receive different biometric signals reduces the cost needed to integrate these electrodes with different types of products, and/or reduces the complexity of devices that require multiple sensors. For example, this modularity can also reduce costs for products that rely on multiple sensors, such as AR/VR headsets (referred to herein generally as head-worn wearable devices).

In some embodiments, the sensors for the wearable device (e.g., the electrodes discussed herein) can also make use of an electrode with first shape (e.g., a spherical cap shape) to ensure that the electrode does not cause discomfort to a user while it is sensing neuromuscular signals (e.g., the electrode can accurately detect the signals even at a shallow skin-depression depth, such as a depth of 0.8 mm). This also helps to advance the improvements allowing for a wearable device that can be designed such that it is comfortable, functional, practical, and socially acceptable for day-to-day use. Other embodiments can also make use of flat electrodes that minimally protrude above a surface of a band (e.g., 0-2 mm of protrusion beyond a surface of the band), while still other embodiments make use of combinations of electrodes having spherical-cap shapes and those having a flat shape (e.g., the spherical cap-shaped electrodes can be coupled to a capsule portion of a wrist-wearable device, while the flat electrodes can be coupled to a band portion of the wrist-wearable device). In other embodiments, the electrodes may also be made of a deformable structure that allows the electrode to be comfortably compressed onto a skin surface of a user.

Further, the wearable devices described herein can also improve users' interactions with artificial-reality environments and also improve user adoption of artificial-reality environments more generally by providing a form factor that is socially acceptable and compact, thereby allowing the user to wear the device throughout their day (and thus making it easier to interact with such environments in tandem with (as a complement to) everyday life). In the descriptions that follow, references are made to artificial-reality environments, which include, but are not limited to, virtual-reality (VR) environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

(A1) In accordance with some embodiments, a dry electrode comprises a conductive exterior surface of a dry electrode (e.g., FIG. 1A shows a dry electrode 100 with a conductive exterior surface 103) configured to contact skin of a user (e.g., FIG. 2A shows a wearable device 200 that includes one or more dry electrodes that are in contact with a portion of a wrist 202 of a user) to receive one or more neuromuscular signals (e.g., no electrode gel is required between the surface and the skin of the user to allow the dry electrode to receive these one or more neuromuscular signals), the one or more neuromuscular signals configured to cause the user to perform a muscular movement. The dry electrode comprises an interior surface of the dry electrode defining a volume of space (e.g., a cavity) configured to house (e.g., partially encase) one or more electrical signal-processing components (e.g., FIG. 1A illustrates electrical signal-processing components 106 housed within the volume of space 107 defined by the interior surface 104 of the dry electrode 100), and the one or more electrical signal-processing components can be configured to process the one or more neuromuscular signals (e.g., filter noise from the one or more neuromuscular signals) to produce one or more processed neuromuscular signals. The electrical signal-processing components housed within the volume of space defined by the interior surface of the dry electrode are also configured to provide the processed neuromuscular signals to one or more processors (e.g., one or more processors associated with a compute core (e.g., processors 420, FIG. 4) that can receive processed neuromuscular signals from multiple different dry electrodes that are similarly configured with internally housed electrical signal-processing components) to allow, in part, the one or more processors to detect the user's intention to perform the muscular movement. For example, FIG. 1A shows a cross-sectional view of a dry electrode 101 with multiple terminals 110A-110D. The one or more electrical signal-processing components 106 (also referred to as an electronic core, which can refer to a custom three-dimensional silicon core and/or the stacked PCB structures that are the primary examples discussed herein for explanatory purposes) are coupled to multiple terminals 110A-110D for providing processed neuromuscular signals to the one or more processors.

(A2) In some embodiments of A1, the one or more processors to which the processed neuromuscular signals are provided are associated with a compute core of a wearable device, the compute core being separate and apart from the dry electrode (e.g., as shown in FIG. 4, processor(s) 420 can be located within a wearable device 200 and, in some embodiments, that wearable device 200 can include a detachable capsule portion (e.g., capsule portion can detach from a cradle portion that is coupled to a band of the wearable device) that houses the compute core of the wearable device).

(A3) In some embodiments of A1-A2, the interior surface of the dry electrode is coated with a non-conductive insulating material. For example, interior surface 104 of FIG. 1A has a non-conductive insulating material applied.

(A4) In some embodiments of A1-A3, the non-conductive insulating material is a dielectric coating (e.g., interior surface 104 of FIG. 1A has a dielectric insulating material applied).

(A5) In some embodiments of A1-A4, the conductive exterior surface and the interior surface of the dry electrode are each partially made from a (e.g., highly conductive, e.g., $4.55 \times 10^6$ or greater conductivity measured in Siemens per Meter) metal or alloy (e.g., FIG. 1A shows that the conductive hemispherical-like shape 102 is made from a conductive metal, such as a conductive alloy).

(A6) In some embodiments of A1-A5, the conductive exterior surface is coated with a diamond-like coating (DLC) (e.g., a conductive exterior surface 103 coated with a diamond-like coating (DLC) is discussed in reference to FIG. 1A).

(A7) In some embodiments of A1-A6, at least the conductive exterior surface is made of a material that can be easily elastically deformed by physical forces (e.g., 50 GPa or less) at (about) room temperature. For example, the accompanying description of FIG. 1A describes that the conductive exterior surface 103 and/or the entirety of the conductive hemispherical-like shape 102 is deformable by such forces.

(A8) In some embodiments of A1-A7, the material that can be easily elastically deformed by physical forces is a conductive polymer. For example, the accompanying descriptions of FIG. 1A describe that the conductive hemispherical-like shape 102 is formed out of a conductive polymer (e.g., soft conductive polymers (like carbon fibers, CNTs, PEDOT:PSS, etc.)).

(A9) In some embodiments of A1-A8, one of the one or more electrical signal-processing components is coupled to a first printed circuit board (PCB), the first PCB being housed within the volume of space that is defined by the interior surface of the dry electrode. For example, FIG. 1A shows that the electrical signal-processing components 106 are coupled to a first PCB 111, the first PCB 111 being housed within the volume of space 107 that is defined by the interior surface of the dry electrode 100.

(A10) In some embodiments of A1-A9, another one of the one or more signal-processing components is coupled to a second PCB that is distinct from the first PCB, and the first PCB and the second PCB are stacked vertically within the volume of space that is defined by the interior surface of the dry electrode (e.g., FIG. 1B illustrates that a first PCB 116 and a second PCB 114 are stacked vertically within a volume of space 107 that is defined by the interior surface of the dry electrode 100).

(A11) In some embodiments of A1-A10, the interior surface is sealed via a PCB (e.g., the interior surface is sealed by one or more of the signal-processing components) to produce a sealed volume of space (e.g., FIG. 1A shows that the top of the dry electrode 100 is sealed by a sealing layer 112 (e.g., by a printed circuit board (PCB)), which thereby encases the electrical signal-processing components 106). In some embodiments, the PCB is configured to communicatively couple at least some of the electrical signal-processing components with the one or more processors (e.g., FIG. 1A shows a cross-sectional view of a dry electrode 101 with multiple terminals 110A-110D, and the one or more electrical signal-processing components 106 are coupled to multiple terminals 110A-110D for providing processed neuromuscular signals to the one or more processors).

(A12) In some embodiments of A1-A11, the sealed volume of space is water resistant (or waterproof, or with an International Protection (IP) 69 or less rating). For example, FIG. 1A shows that sealing layer 112 makes a sealed volume of space 107 liquid (e.g., water or sweat) resistant, which ensures that conductive liquids do not interfere with the electrical signal-processing components 106.

(A13) In some embodiments of A1-A12, the sealed volume of space is produced (or configured to be produced) using an over-molding process (e.g., FIG. 1A illustrates that the sealed volume of space 107 is produced using an over-molding process).

(A14) In some embodiments of A1-A13, the PCB includes a first terminal that is used by the electrical signal-processing components that are housed within the volume of space defined by the interior surface of the dry electrode to provide the processed neuromuscular signals to the one or more processors. For example, FIG. 1A illustrates that one of the one or more electrical signal-processing components 106 is coupled to one of the terminals 110A-110D for providing processed neuromuscular signals to the one or more processors.

(A15) In some embodiments of A1-A14, the first terminal is an output terminal configured to output (a) buffered signals, (b) buffered and filtered signals, (c) buffered, filtered, and amplified signals, or (d) buffered, filtered, amplified, and digitized signals. Stated another way, the processed neuromuscular signals that are provided by way of the output terminal can include different levels of processing depending on which types of components are internally housed in the electrode's interior volume.

(A16) In some embodiments of A1-A15, the PCB includes a second terminal, distinct from the first terminal, for grounding one or more of the electrical signal-processing components that are housed within the volume of space defined by the interior surface of the dry electrode. For example, FIG. 1A illustrates that one of the one or more electrical signal-processing components 106 is coupled to one of the terminals 110A-110D for grounding one or more of the electrical signal-processing components 106.

(A17) In some embodiments of A1-A16, the PCB includes a third terminal, distinct from the first and second terminals, for connecting one or more of the electrical signal-processing components to a power source. For example, FIG. 1A illustrates that one of the one or more electrical signal-processing components 106 is coupled to one of the terminals 110A-110D for connecting one or more of the electrical signal-processing components to a power source.

(A18) In some embodiments of A1-A17, the conductive exterior surface has a contact area of at least 25 millimeters squared ($mm^2$) and less than 100 $mm^2$. For example, FIG. 1A shows that a conductive exterior surface can be configured to have a contact area of at least 25 millimeters squared ($mm^2$) and/or less than 100 $mm^2$, as indicated by illustrative patch area 105.

(A19) In some embodiments of A1-A18, the conductive exterior surface has a hemispherical shape (e.g., FIG. 1A illustrates that the dry electrode 100 includes a conductive hemispherical-like shape 102 that is in contact with the skin of a user).

(A20) In some embodiments of A1-A19, at least one of the one or more electrical signal-processing components housed within the volume of space defined by the interior surface of the dry electrode is a high-input-impedance buffer. For example, in reference to FIG. 1A, the electrical signal-processing components 106 include a high-input-impedance buffer.

(A21) In some embodiments of A1-A20, at least one of the one or more electrical signal-processing components housed within the volume of space defined by the interior surface of the dry electrode is a high-impedance amplifier. For example, in reference to FIG. 1A, the electrical signal-processing components 106 include a high-impedance amplifier.

(B 1) In another aspect, a wearable device is provided. The wearable device includes a band donned by a user, the band including a plurality of dry electrodes configured to sense neuromuscular signals, each of the plurality of dry electrodes configured in accordance with A1-A21. The wearable device, in one example, can be a wrist-worn wearable device. Systems including the wrist-wearable device in addition to a head-worn wearable device can also be provided, such that the user's intention to perform the muscular movement can be used to cause performance of respective commands at either, or both, of the wearable device and/or the head-worn wearable device (as was mentioned earlier, either or both of the wrist-wearable device and the head-worn wearable device can be coupled with various active-embedded bioelectrodes to allow for sensing of various types of biometric signals). In some embodiments, the dry electrodes described herein can be incorporated into wrist-worn and head-worn wearable devices.

(C1) In another aspect, a method of manufacturing a dry electrode is provided, the method including forming the conductive exterior surface and the interior surface of A1, housing the electrical signal-processing components of A1 within the volume of space defined by the interior surface, and forming the dry electrode to have the aspects of A1-A21.

(D1) In one other aspect, a method of manufacturing a wearable device is provided. The wearable device has dry electrodes for sensing neuromuscular signals, and the method includes coupling a plurality of dry electrodes to the wearable device, the plurality of dry electrodes each being configured in accordance with any of A1-A21.

(E1) In another aspect, a method of using a single smart electrode to create processed biometric data for multiple types of biometric readings (e.g., an electrode with a hollowed-out interior that includes signal-processing components) is provided. The method comprises receiving (e.g., raw unprocessed) sensor data from a single smart electrode that is integrated into a wearable device (e.g., integrated into a fabric or elastomeric band; the wearable device can be a wrist-wearable device or some other type of wearable device, such as an anklet, head-wearable device (including smart contacts or larger structures worn on a user's head), etc.). For example, a single dry electrode 606 is shown in FIG. 6. The wearable device is worn by a user and the single smart electrode is configured to be in contact with skin of a user (e.g., the skin is located at a wrist or ankle of a user). For example, FIG. 6 shows the wearable device 602 being worn by the user around their wrist while exercising. The sensor data can include multiple different biometric signals, each associated with a different type of biometric reading. For example, these different a first biometric signal associated with a first type of biometric reading (such as a heartrate) and a second biometric signal associated with a second type of biometric reading (such as an EMG reading associated with motor actions). Some embodiments of the smart electrode can also be configured to sense both biometric and other types of signals (e.g., barometric, ambient light). The method also includes processing (e.g., in response to receiving the sensor data from the single smart electrode) the sensor data using electrical signal-processing circuitry housed within the smart electrode (e.g., FIG. 7A shows one or more electrical signal-processing components 705 housed within a cavity of the dry electrode 706) to create processed first biometric data corresponding to a first type of biometric reading for the user (e.g., EMG reading, ECG reading, EEG reading, EOG reading, temperature reading, skin pressure reading, PPG (O2) reading) and processed second biometric data corresponding to a second type of biometric reading for the user, where the second type of biometric reading is different from the first type of biometric reading (e.g., EMG reading, ECG reading, EEG reading, EOG reading, temperature reading, skin pressure reading, PPG (O2) reading). For example, FIG. 6 illustrates a first graph 608 that shows a first reading 610 indicating a first-channel electromyography (EMG) signal being received over time, and a third graph 616 that shows a third reading 618 indicating a second-channel electromyography (EMG) signal being received over time. In some embodiments, a portion of the processing occurs using components of an analog front end (AFE), the AFE being housed within the single smart electrode. In some embodiments, the housing is an air cavity and in some embodiments the air cavity includes a hole on a side wall to release gases during a reflow process. In some embodiments, the housing is vacuum-sealed and in some embodiments the housing is epoxy-filled. The method also includes providing the processed first biometric data and the processed second biometric data to a processor that is in communication with the wearable device (e.g., the processor can be a central processor that is located wholly or partially at the wearable device, or the central processor is wholly or partially located at an external device (e.g., a mobile device, a personal computer, a cloud service), and/or the central processor is wholly or partially located within the single smart electrode). In some embodiments, the single smart electrode includes only analog components and no digital components. In some embodiments, the single smart electrode includes electrostatic discharge (ESD) protection. In some embodiments, a single smart electrode has two distinct electrically conductive paths to skin of a user, such that the locations of sensing are spatially offset from each other. In some embodiments, this spatial offset causes offsets in temporal and amplitude measurements, which then constitute the differential signal. In some embodiments, the processed first biometric data and the processed second biometric data that are provided to the processor that is in communication with the wearable device can then undergo further processing by the processor of the wearable device to actually determine appropriate values for the first and second types of biometric readings.

(E2) In some embodiments of E1, a portion of the single smart electrode that is configured to be in contact with the skin of the user is at least made from a conductive deformable (e.g., elastomeric) material (e.g., FIG. 10A shows in its second pane 1009 that a conductive deformable (e.g., soft elastomeric) material 1010 is over-molded on top of the PCB 1008 to produce a dry electrode having a soft conductive surface 1012).

(E3) In some embodiments of any of E1-E2, the sensor data includes a non-biometric reading that is different from the first biometric signal and the second biometric signal (e.g., ambient light reading, barometric reading, contact pressure reading, force reading, inertial reading, acceleration reading, a gyroscopic reading, humidity reading, a moisture reading (e.g., to detect sweat (i.e., a biometric reading) or contact to water (i.e., a non-biometric reading))). For example, FIG. 6 illustrates a second graph 612 associated with the single dry electrode that shows a second reading 614 indicating an external biometric pressure (i.e., a non-biometric signal) being detected by the single dry electrode over time.

(E4) In some embodiments of any of E1-E3, the method includes receiving additional sensor data from another smart electrode that is integrated into a wearable device and configured to be in contact with skin of the user. In some embodiments, the method includes processing the additional sensor data using electrical signal-processing circuitry housed within the other smart electrode to create a processed third biometric data corresponding to a third type of biometric reading for the user. In some embodiments, this optionally takes place in response to receiving the additional sensor data from the at least one other smart electrode. In some embodiments, the method also includes, after determining that the processed third biometric data corresponds to the processed first type of biometric reading, aggregating, via a processor, the first processed biometric data and the third processed biometric data to create an aggregated-processed-biometric data (e.g., the aggregated biometric signal can be used to reduce noise from the signal). For example, FIG. 8A illustrates a schematic indicating multiple dry electrodes each having an integrated analog-to-digital converter (ADC) that is configured to perform pseudo-differential sensing, and, in another example, FIG. 8B illustrates a schematic indicating multiple dry electrodes that share a discrete ADC, and the arrangement being configured to perform pseudo-differential sensing.

While one example is provided of creating aggregated-processed biometric data, the methods discussed herein can make determinations as to whether multiple smart electrodes are sensing data for the same type of biometric readings (e.g., multiple smart electrodes picking up signals associated with a heart rate reading, a skin temperature reading). For example, the method can also include, in accordance with a determination that the processed third biometric data corresponds to the processed second biometric data, aggregating, via the processor, the processed second biometric data and the processed third biometric data to produce second aggregated-processed-biometric data.

(E5) In some embodiments of any of E1-E4, the method includes, processing the sensor data using the electrical signal-processing circuitry housed within the smart electrode to create the processed first biometric data corresponding to a first type of biometric reading for the user. In some embodiments, the method further includes comparing the processed first biometric data to a reference processed biometric data and detecting, partially based on the comparison, whether there is noise in the processed first biometric data. The method also includes, in accordance with a determination that noise is detected, removing the noise from the processed first biometric data. For example, FIG. 8A illustrates a schematic indicating multiple dry electrodes each having an integrated analog-to-digital converter (ADC) that is configured to perform pseudo-differential sensing. In some embodiments, the single smart electrode is configured as a pseudomonopolar-sensing electrode and the comparison occurs at the single electrode. In some embodiments, a pseudomonopolar single smart electrode is communicatively coupled to a reference electrode in order to remove noise from the signal. In some embodiments, multiple smart electrodes share a single reference electrode in order to remove noise from the sensed signal. Accordingly, by using multiple pseudomonopolar electrodes in conjunction with a single reference electrode, the number of required electrodes is reduced, thereby reducing complexity and production costs while achieving the same performance. In some embodiments, the comparison occurs at a reference electrode distinct and separate from the single smart electrode.

(E6) In some embodiments of any of E1-E5, the first type of biometric reading and the second type of biometric reading are one of a temperature reading, an impedance reading, or a photoplethysmography (PPG) reading.

(E7) In some embodiments of any of E1-E6, the method includes receiving additional sensor data from the single smart electrode that is integrated into the wearable device. In some embodiments, the method also includes processing the additional sensor data using the electrical signal-processing circuitry housed within the smart electrode to create processed non-biometric data corresponding to one of a pressure reading, a force reading, an inertial measurement reading, an accelerometer reading, a gyroscopic reading, and a humidity reading. For example, FIG. 6 illustrates a second graph 612 associated with the single dry electrode that shows a second reading 614 indicating an external biometric pressure (e.g., a non-biometric signal) being detected by the single dry electrode over time.

(E8) In some embodiments of any of E1-E7, the electrical signal-processing circuitry includes a first electrical signal-processing circuitry designed to create the processed first biometric data and also includes a second electrical signal-processing circuitry designed to create the processed second biometric data. In other words, the smart electrode can essentially house multiple types of sensors, such as first electrical signal-processing circuitry designed to process PPG signals (e.g., a first type of sensor), and second electrical signal-processing circuitry designed to process EMG signals (e.g., a second type of sensor).

(E9) In some embodiments of any of E1-E8, the first electrical sensor is a PPG sensor, and the second electrical sensor is a temperature sensor. In some embodiments, the sensors are discrete components of the single smart electrode. In some embodiments, some of the sensors are placed on a surface designed to make contact with skin of a user to record data (e.g., PPG sensor(s), pressure sensor(s), a temperature sensor(s)) and some of the sensors are not in contact with the skin of the user (e.g., placed in an interior of the single smart electrode or integrated into the signal-processing components), such as IMU sensor(s), humidity sensor(s), impedance sensor(s), etc.

(E10) In some embodiments of any of E1-E9, the single smart electrode is used as a differential sensor, and a first circuit (electrically conductive path) associated with a first side of the single smart electrode and a second circuit (electrically conductive path) associated with a second side (distinct and separate from the first side) of the single smart electrode are separated by a common mode capacitor that is configured to provide a common mode capacitance. For example, FIG. 7A shows a common mode capacitance 702 separating the first channel of the dry electrode 704 from the second channel of the dry electrode 706.

(E11) In some embodiments of E10, the common mode capacitance is made of a dielectric material.

(E12) In some embodiments of any of E1-E9, the method includes processing the sensor data using the electrical signal-processing circuitry that is housed within the single smart electrode to create processed third biometric data corresponding to a third type of biometric reading for the user that is different from the first type of biometric reading and the second type of biometric reading. In some embodiments, the third type of biometric reading for the user is the same as either the first or second type of biometric reading. In some embodiments, having redundant types of biometric readings for the user ensures better recorded and more accurate data readings (e.g., by comparing the readings to reduce noise from external stimuli).

(E13) In some embodiments of E12, the method includes processing the sensor data using the electrical signal-processing circuitry that is housed within the single smart electrode to create processed fourth biometric data corresponding to a fourth type of biometric reading for the user that is different from the first type of biometric reading, the second type of biometric reading, and the third type of biometric reading.

(E14) In some embodiments of E13, the method includes processing the sensor data using the electrical signal-processing circuitry that is housed within the single smart electrode to create processed fifth biometric data corresponding to a fifth type of biometric reading for the user that is different from the first type of biometric reading, the second type of biometric reading, the third type of biometric reading, and the fourth type of biometric reading.

(E15) In some embodiments of any of E1-E9, the processing includes using the electrical signal-processing circuitry that is housed within the single smart electrode to filter a respective biometric signal included in the sensor data in conjunction with creating the processed first biometric data or the processed second biometric data.

(E16) In some embodiments of E15, the processing includes using the electrical signal-processing circuitry that is housed within the single smart electrode to apply a gain to (amplify) the first type of biometric reading for the user and (or) the second type of biometric reading for the user.

(E17) In some embodiments of E15, the electrical signal-processing circuitry includes an analog-to-digital converter (ADC). In some embodiments, the method further includes converting, via the ADC, the processed first biometric data and (or) the processed second biometric data to a digital signal. For example, FIG. 8A shows that each of the AFEs includes a specific gain and filter that is then followed by a respective ADC (ADC 806, ADC 812, ADC 818, and ADC 824). In some embodiments, the ADC is included in a single pseudo-differential sensing smart electrode. In some embodiments, the electrical signal-processing circuitry does not include an ADC and transmits the first type of biometric reading (or the processed first biometric data) and second type of biometric signal (or the processed second biometric data) without converting it to a digital signal. In some embodiments, the ADC is external (e.g., discrete) to the single smart electrode. In some embodiments, a pseudomonopolar smart electrode does not include an ADC.

(F1) In another aspect, a single smart electrode comprises electrical signal-processing circuitry. The single smart electrode also includes memory and the memory storing one or more programs that are configured to be executed by the electrical signal-processing circuitry. The one or more programs also include instructions for receiving sensor data from the single smart electrode. The single smart electrode is integrated into a wearable device, and the wearable device is worn by a user. The single smart electrode is configured to be in contact with skin of a user. Processing the sensor data using electrical signal-processing circuitry housed within the smart electrode creates (i) processed first biometric data corresponding to a first type of biometric reading for the user, and (ii) processed second biometric data corresponding to a second type of biometric reading for the user. In some embodiments, the second type of biometric reading is different from the first type of biometric reading. Providing the processed first biometric data and the processed second biometric data to a processor that is in communication with the wearable device.

(G1) In another aspect, the wearable device comprises a band donned by a user, the band including a single smart electrode that is configured to create processed biometric data for multiple types of biometric readings, the single smart electrode configured in accordance with any of E1-E17.

(H1) In another aspect, a method of manufacturing a single smart electrode comprises forming multiple biometric sensors and housing the electrical signal-processing circuitry of claim 1 within a volume of space defined by an interior surface, and forming a single smart electrode to have the aspects of any of E1-G17.

(J1) In another aspect, a method of manufacturing a wearable device having a single smart electrode for sensing multiple different signal types, comprises coupling a plurality of single smart electrodes formed in accordance with any of E1-E17 with a band of the wearable device.

(K1) In another aspect, a smart electrode for receiving biometric signals comprises one or more electrical signal-processing components configured to at least partially process received biometric signals. The smart electrode also includes a conductive deformable (e.g., soft elastomeric) material that is adhered (e.g., over-molded or bonded) to the one or more electrical signal-processing components (e.g., FIG. 10A also shows in a second pane 1009 a conductive deformable (e.g., soft elastomeric) material 1010 over-molded on top of the rigid PCB 1008 to produce a dry electrode having a soft conductive surface 1012). The conductive deformable material is configured to deform while the conductive deformable material is in contact with skin of a user. The conductive deformable material is configured to define an outer surface of an electrode that receives a biometric signal from the user while the outer surface of the electrode is in contact with the skin of the user (e.g., FIG. 10B illustrates in another pane 1011 the dry electrode having a soft conductive surface 1012 placed within a wearable device 1014 (e.g., a wrist-wearable device to be worn around a wrist of a user)). The conductive deformable material also is configured to provide (e.g., conduct the signal from one place to another) the biometric signal to the one or more electrical signal-processing components that are housed within the conductive deformable material for at least partially processing the biometric signal (e.g., conductive prongs 1006A and 1006B in FIG. 10A are configured to receive signals from the conductive deformable material).

(K2) In some embodiments of K1, the conductive deformable material has a hardness rating of less than 90 on a Shore 00 scale.

(K3) In some embodiments of any of K1-K2, the one or more electrical signal processing components are coupled to a rigid structure (e.g., rigid PCB 1008, electrical signal-processing circuitry 1004A and 1004B, and conductive prongs 1006A and 1006B shown in FIG. 10A).

(K4) In some embodiments of any of K1-K2, the one or more electrical signal processing components are coupled to a flexible structure.

(K5) In some embodiments of K4, the flexible structure is a flexible printed circuit board (e.g., the flexible printed circuit board described in reference to FIG. 14).

(K6) In some embodiments of any of K1-K5, the conductive deformable material is adhered to the rigid structure using an over-mold process. In some embodiments, the rigid structure includes one or more features or cutouts for aiding (e.g., providing additional adhesion) in the over-molding process. For example, FIG. 10A also shows in a second pane 1009 that a conductive deformable (e.g., soft elastomeric) material 1010 is over-molded on top of the rigid PCB 1008 to produce a dry electrode having a soft conductive surface 1012.

(K7) In some embodiments of any of K1-K6, the conductive deformable material is adhered to the rigid structure using epoxy (e.g., HENKEL Epoxy or a B-stage epoxy).

(K8) In some embodiments of any of K1-K7, the rigid structure includes (partially) a printed circuit board (PCB). In some embodiments, the rigid structure is a metal or plastic structure that is configured to have the one or more electrical signal-processing components affixed to it. For example, FIG. 10A also shows a second pane 1009 that shows a conductive deformable (e.g., soft elastomeric) material 1010 over-molded on top of the rigid PCB 1008.

(K9) In some embodiments of any of K1-K8, the conductive deformable material includes a fluorocarbon elastomer (e.g., FKM rubber).

(K10) In some embodiments of any of K1-K9, the conductive deformable material includes an elastomeric material.

(K11) In some embodiments of any of K1-K10, the smart electrode and another smart electrode combine to form a differential pair of connected (e.g., physically connected, communicatively connected, adjacently connected) smart electrodes, wherein the smart electrode and the other smart electrode are separate physical structures.

(K12) In some embodiments of K11, the elastomeric material includes 5%-15% carbon nanotubes (CNT) (e.g., thereby creating a silicone composite material).

(K13) In some embodiments of K11, the elastomeric material includes 5%-15% fibrous material (e.g., thereby creating a silicone composite material). In some embodiments, the 5%-15% fibrous material is combined with 5%-15% carbon nanotubes within the silicone.

(K14) In some embodiments of K11, the elastomeric deformable material includes 70%-90% silicone. In some embodiments, the silicone includes sylgard 184. (e.g., a silicone elastomer).

(K15) In some embodiments of any of K1-K10, the smart electrode for receiving biometric signals is integrated into a single wrist-wearable device (e.g., FIG. 10B illustrates the dry electrode having a soft conductive surface 1012 placed within a wearable device 1014 (e.g., a wrist-wearable device)).

(K16) In some embodiments of any of K15, one or more additional smart electrodes are integrated into the single wrist-wearable device. For example, FIG. 10B illustrates multiple additional dry electrodes having a soft conductive surface placed within the wearable device (1016A-1016F). In some embodiments, the one or more additional smart electrodes and the smart electrode are in communication (e.g., communicatively coupled) with a local and/or remote processing component.

(K17) In some embodiments of K16, the smart electrode and at least one of the one or more additional smart electrodes are communicatively coupled with each other (e.g., FIG. 11 shows that electrode 1102A is in communication with the electrode 1102B, via one or more communication components (e.g., a ribbon cable, an FPC)).

(K18) In some embodiments of K16, the smart electrode is coupled to a wearable band. In some embodiments, the wearable band structure includes an elastic material that supports the smart electrode. In some embodiments, the elastic material is configured to deform when the wearable band is placed against skin of a user. FIGS. 12A-12C illustrate example bands that incorporates multiple techniques for improving comfort of a wearable device.

(K19) In some embodiments of K18, the elastic material that supports the smart electrode is a (a metal or an elastomer) truss (e.g., a leaf spring or an arched ribbing). For example, FIG. 12A illustrates arch ribs 1208 for supporting an electrode 1210.

(K20) In some embodiments of K18, the elastic material that supports the smart electrode includes a (a metal or an elastomer) compressible spring (e.g., a coil-like structure configured to compress when put in contact with skin of a user). For example, FIG. 13 illustrates a first example spring mechanism 1300 and a second example spring mechanism 1302 for supporting one or more electrodes.

(K21) In some embodiments of K20, the wearable structure is encased in a soft material (e.g., rubber, fabric). FIG. 12C shows the band 1200 having a conductive cover 1212. In some embodiments, the soft material is conductive. In some embodiments, the soft material is configured to shield underlying componentry, including a spring placed beneath the smart electrode. In some embodiments, an internal stiffening element is placed beneath the elastic material.

(L1) In another aspect, a method of manufacturing a smart electrode comprises providing one or more electrical signal-processing components configured to at least partially process received biometric signals. For example, FIG. 10A shows in first pane 1002 that electrical signal-processing circuitry 1004A and 1004B and conductive prongs 1006A and 1006B for receiving signals coupled to a rigid PCB 1008 of a dry electrode are provided. The method of manufacturing also includes coupling (e.g., adhering, gluing, or over-molding or bonding) a conductive deformable material to one or more electrical signal-processing components, where the conductive deformable material encases the one or more electrical signal-processing components (e.g., FIG. 10A also shows a second pane 1009 that shows a conductive deformable (e.g., soft elastomeric) material 1010 over-molded on top of the rigid PCB 1008 to produce a dry electrode having a soft conductive surface 1012). The conductive deformable material is configured to deform while the conductive deformable material is in contact with skin of a user and define an outer surface of an electrode that receives a biometric signal from the user while the outer surface of the electrode is in contact with the skin of the user. In addition, the biometric signal is provided to the one or more electrical signal-processing components that are housed within the conductive deformable material for at least partially processing the biometric signal. In some embodiments, the method also includes coupling a rigid structure with the one or more electrical signal-processing components (and the conductive deformable material can be coupled (e.g., adhering, gluing, or over-molding or bonding) to the rigid structure as well).

(L2) In some embodiments of L1, further comprising manufacturing steps to produce the smart electrode in accordance with any of K2-K21.

(M1) In yet another aspect, a wearable device comprises a band donned by a user, the band including a smart electrode for receiving biometric signals, wherein the smart electrode is configured in accordance with any of K1-K21.

(M2) In some embodiments of M1, further comprising, coupled with the band, a plurality of smart electrodes, each respective smart electrode of the plurality configured in accordance with any of K1-K21.

For any of the above aspects, a system including multiple wearable devices (e.g., a head-wearable device and a wrist-wearable device as just one example system) some or all of which include various embodiments of the smart electrodes described herein can be provided.

Note that the various embodiments described above can be combined in various ways with other embodiments described herein. The features and advantages described in the specification are not necessarily all inclusive and, in particular, some additional features and advantages will be apparent to one of ordinary skill in the art upon reading the drawings, specification, and claims. Moreover, it should be noted that the language used in the specification has been principally selected for readability and instructional purposes and has not necessarily been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not necessarily considered to be limiting, for the description may admit to other effective features as the person of skill in this art will appreciate upon reading this disclosure.

Figure 1A:
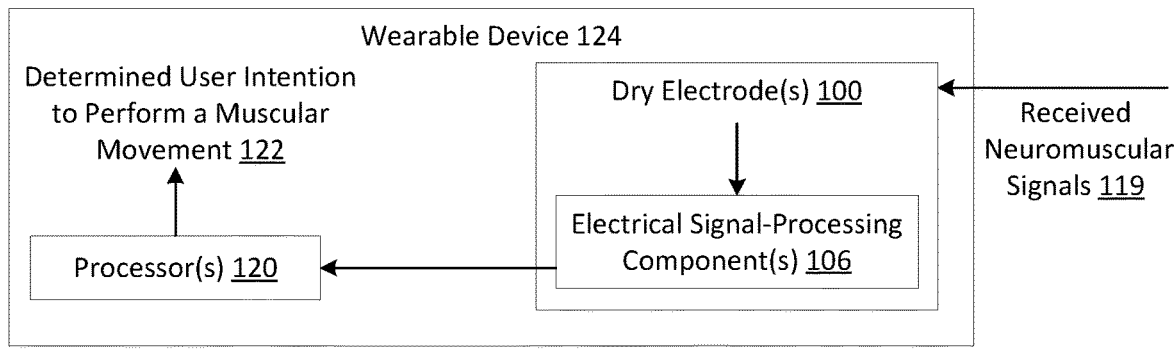
FIG. 1A illustrates a wearable device that includes one or more dry electrodes, as well as a cross-sectional view of one of the dry electrodes and a plot showing raw and processed signals received and processed, respectively, at the dry electrode, in accordance with some embodiments.
Figure 1A:
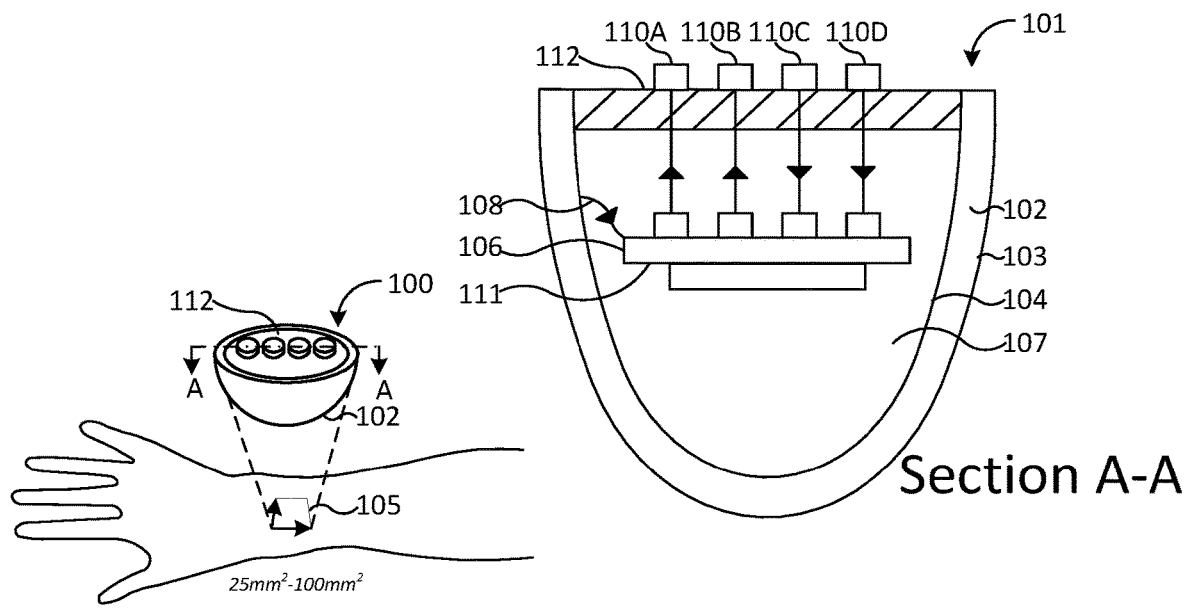
Figure 1A:
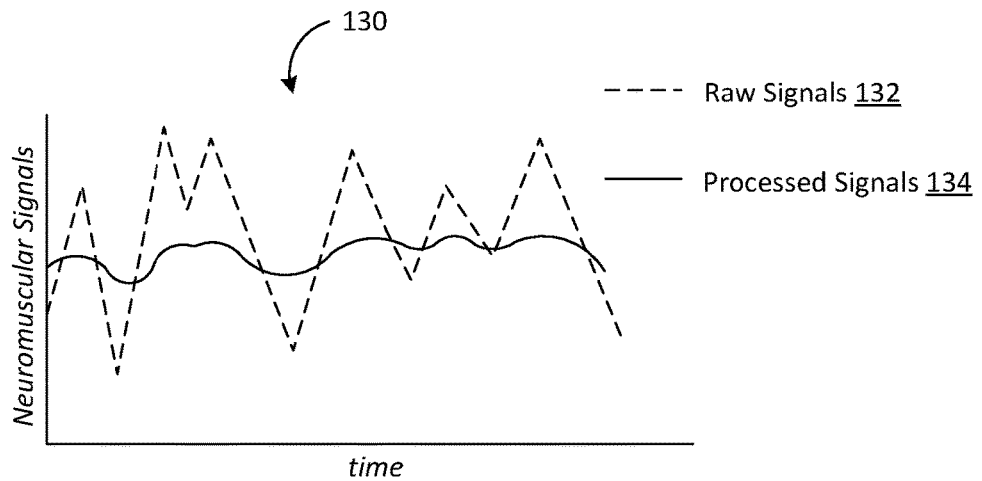

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1A illustrates a dry electrode 100, and a cross-sectional view of a dry electrode 101 configured to contact skin of a user, in accordance with some embodiments. FIG. 1A illustrates that the dry electrode 100 includes a conductive hemispherical-like shape 102 for an exterior surface 103 that is in contact with the skin of a user and encases one or more electrical components. The conductive hemispherical-like shape 102, as shown in the cross-sectional view of a dry electrode 101, includes a conductive exterior surface 103 and also defines an interior surface 104. The depiction and description of the hemispherical-like shape for FIG. 1A (and elsewhere herein) is one example shape; other examples include a flat rectangular-shaped exterior surface that protrudes a minimal amount (e.g., 0-2 mm) above a band of the wearable device. The inventive technique of housing electrical signal-processing components in the dry electrode applies regardless of the shape of the exterior surface of the dry electrode, including applying to flat (or flat, rectangular-shaped) dry electrodes.

The conductive exterior surface 103 is configured to be in contact with skin of a user (see, e.g., FIGS. 2A-2B) to receive one or more neuromuscular signals from the user.

FIG. 1A also shows that the conductive exterior surface can be configured to have a contact area of at least 25 millimeters squared (mm²) and/or less than 100 mm², as indicated by illustrative patch area 105.

Since this is a dry electrode, there is no need for electrode gel between the conductive exterior surface 103 and the skin of the user. The interior surface 104 defines a volume of space that is configured to house one or more electrical signal-processing components 106. The electrical signal-processing components 106 housed within the volume of space 107 defined by the interior surface 104 of the dry electrode 100 are also configured to provide the processed neuromuscular signals to one or more processors (not pictured) to allow, in part, the one or more processors to detect the user's intention to perform the muscular movement. In some embodiments, the one or more processors to which the processed neuromuscular signals are associated with a compute core of a wearable device. In some embodiments, the compute core is separate and apart from the dry electrode 100.

In some embodiments, the interior surface 104 has a non-conductive insulating material applied (e.g., a dielectric coating). In some embodiments, the conductive hemispherical-like shape 102 is made from a conductive metal, such as a conductive alloy, a conductive metal (e.g., gold), and/or conductive polymer (e.g., that is easily elastically deformed by low physical forces (e.g., 50 GPa or less) at (about) room temperature). In some embodiments, the conductive exterior surface 103 is coated with a diamond-like coating (DLC).

FIG. 1A also shows the electrical signal-processing components 106 coupled to the interior surface 104, as indicated by arrowed line 108. In some embodiments, the electrical signal-processing components 106 include a high-input-impedance buffer (not pictured). In some embodiments, the electrical signal-processing components 106 include a high-impedance amplifier (not pictured).

FIG. 1A also shows that the top of the dry electrode 100 is sealed by a sealing layer 112 (e.g., by a printed circuit board (PCB)), which thereby encases the electrical signal-processing components 106. In some embodiments, the sealing layer 112 makes the sealed volume of space 107 liquid (e.g., water or sweat) resistant, which ensures that conductive liquids do not interfere with the electrical signal-processing components 106. In some embodiments, the electrical signal-processing components 106 are coupled to a first PCB 111, the first PCB 111 being housed within the volume of space 107 that is defined by the interior surface 104 of the dry electrode 100. In some embodiments, sealed volume of space 107 is produced using an over-molding process.

FIG. 1A also shows a cross-sectional view of a dry electrode 101 with multiple terminals 110A-110D. The one or more electrical signal-processing components 106 are coupled to multiple terminals 110A-110D for providing processed neuromuscular signals to the one or more processors, for receiving signals from the one or more processors, for grounding one or more of the electrical signal-processing components 106, and/or for connecting one or more of the electrical signal-processing components 106 to a power source.

A top portion of FIG. 1A depicts a block diagram showing how the dry electrode 100 is in communication with other components of a wearable device 124 to allow for the detecting of in-air hand gestures. The wearable device 124 includes one or more dry electrodes 100 that each internally house their respective electrical signal-processing component(s) 106. The wearable device 124 also includes a processor(s) 120 coupled to the dry electrode 100 and consequently the electrical signal-processing components 106. The wearable device is configured to receive neuromuscular signals 119 via the dry electrode 100, and the received neuromuscular signals 119 are then passed to the electrical signal-processing component 106 for signal processing. The processed signals are then sent to the processor(s) 120 in order for the processor(s) to determine the user intention to perform a muscular movement 122. In some embodiments, the determined user intention to perform a muscular movement 122 can be sent to an external device for further use (e.g., controlling a displayed user interface, and/or recording biometric data).

FIG. 1A also illustrates an example of how the dry electrode(s) 100 can be used to detect movements of fingers and hands. FIG. 1A shows in graph 130 that raw signals 132 are produced, and subsequently detected by one or more dry electrodes 100. The electrical signal-processing component 106 then produces a processed signal 134 based on the raw signals 132. The processed signal 134 is then sent to a processor(s) in order to determine a user intention to perform a muscular movement.

Figure 1B:
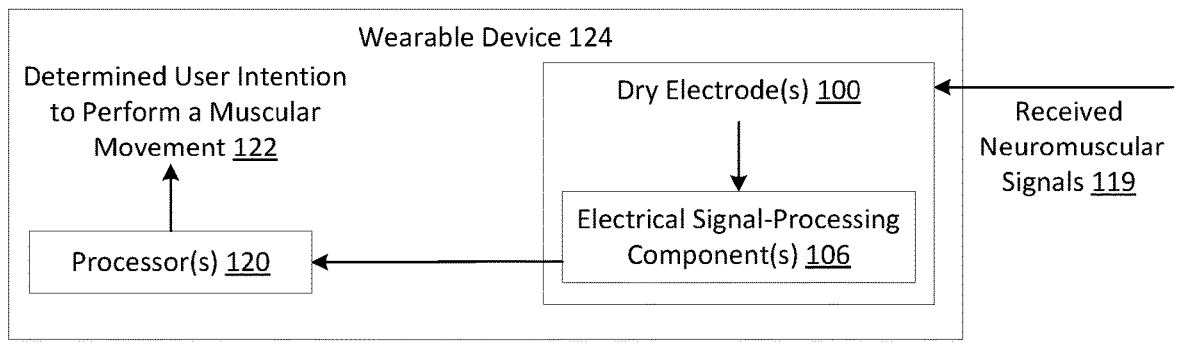
FIG. 1B illustrates another configuration for a dry electrode in which electrical signal-processing components include multiple stacked PCBs that are internally housed in the dry electrode, in accordance with some embodiments.
Figure 1B:
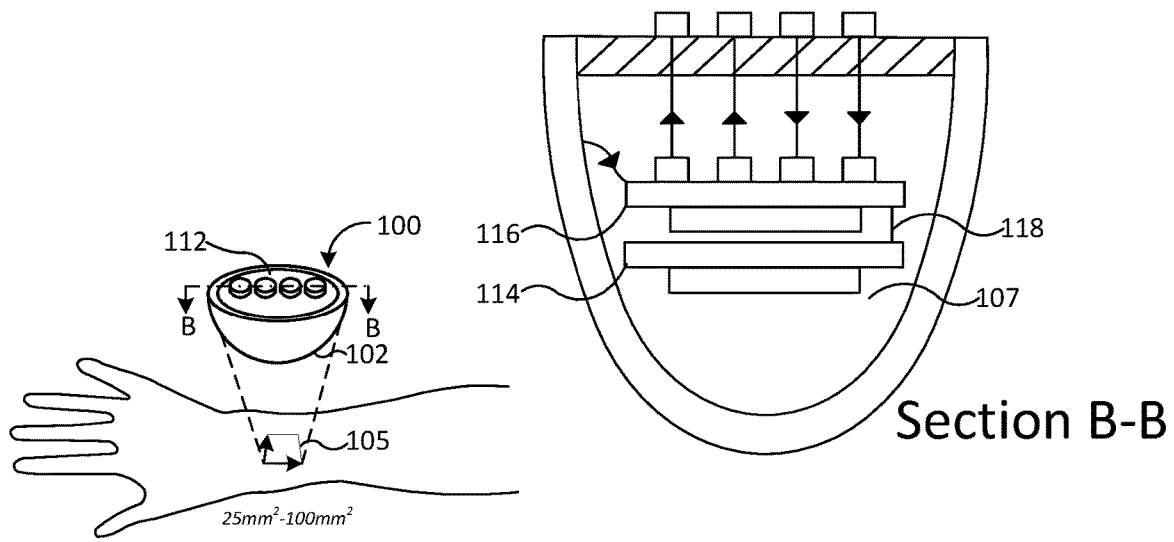
Figure 1B:
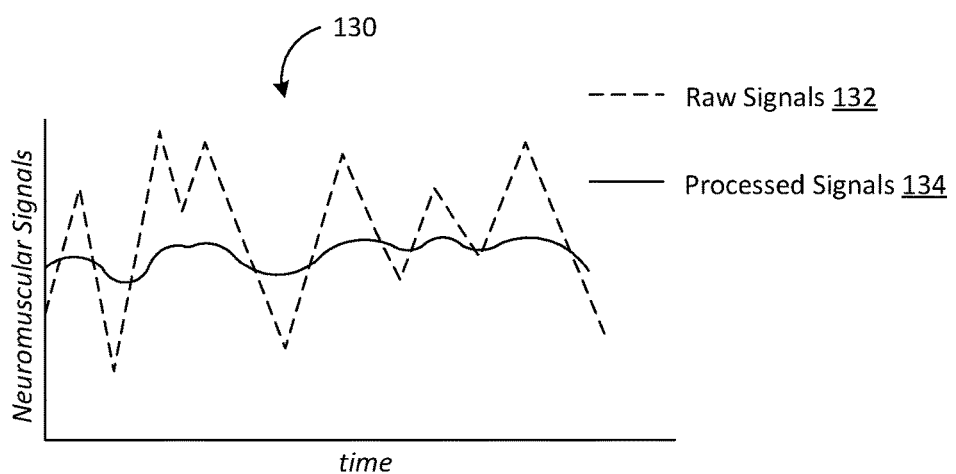

FIG. 1B is similar to FIG. 1A, but further illustrates another configuration for a dry electrode 100, in which stacked PCBs are internally housed (e.g., the electrical signal-processing components 106 include another PCB 114 that is distinct from a first PCB 116 and in a stacked configuration relative to PCB 116, in accordance with some embodiments). The first PCB 116 and the second PCB 114 are stacked vertically within the volume of space 107 that is defined by the interior surface of the dry electrode 100. In some embodiments, the first PCB 116 is coupled, e.g., indicated by wire 118, to the other PCB 114. Wearable devices can be configured with dry electrodes 100 of various configurations and shapes, e.g., some dry electrodes with the configuration of FIG. 1A and others with the configuration of FIG. 1B, while other wearable devices can be homogenously configured with dry electrodes of one configuration (e.g., all dry electrodes of the FIG. 1A configuration or all dry electrodes of the FIG. 1B configuration).

FIG. 1B also illustrates an example of how the dry electrode(s) 100 can be used to detect movements of fingers and hands. FIG. 1B shows in graph 130 that raw signals 132 are produced and subsequently are detected by one or more dry electrodes 100. The electrical signal-processing component 106 then produces a processed signal 134 based on the raw signals 132. The processed signal 134 is then sent to a processor(s) in order to determine a user intention to perform a muscular movement.

Figure 2A:
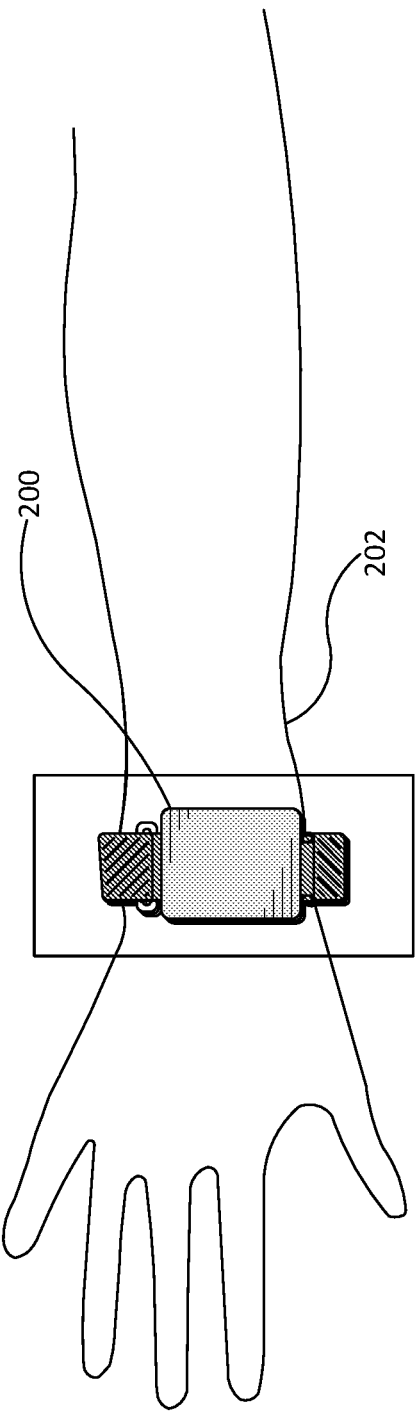
FIG. 2A illustrates a wearable device, comprising a band donned by a user, the band and/or the wearable device including a plurality of dry electrodes configured to sense neuromuscular signals, in accordance with some embodiments.
Figure 2B:
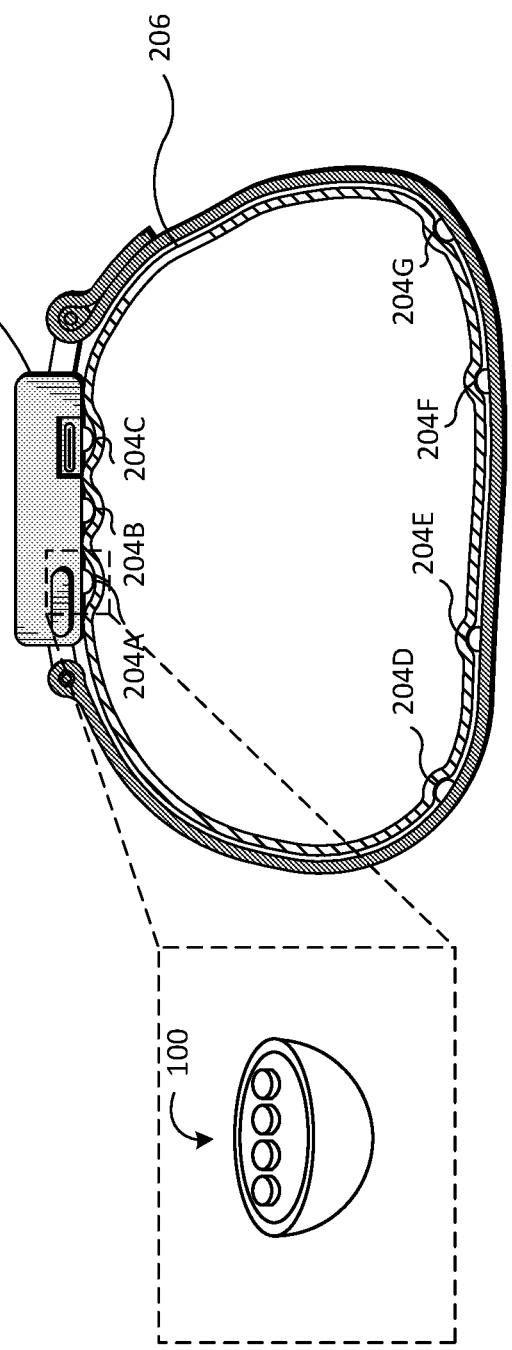
FIG. 2B shows a side view of the wearable device while it is donned by the user in FIG. 2A, the wearable device including a plurality of dry electrodes configured to sense neuromuscular signals, in accordance with some embodiments.

FIG. 2A illustrates a wearable device, comprising a band donned by a user, the band and/or the wearable device including a plurality of dry electrodes configured to sense neuromuscular signals, in accordance with some embodiments. FIG. 2A illustrates a wearable device 200 (e.g., a watch device) donned on a wrist 202 of a user. FIG. 2B shows a side view of the wearable device, comprising a band and/or the wearable device including a plurality of dry electrodes configured to sense neuromuscular signals, in accordance with some embodiments. FIG. 2B shows a plurality of dry electrodes 204A-204G either integrated into the watch device 200 and the watch band 206. FIG. 2B also shows an exploded view of dry electrode 204A, which shows that the dry electrode 204A is the same as the dry electrode 100 discussed in reference to FIGS. 1A-1B.

Figure 2C:
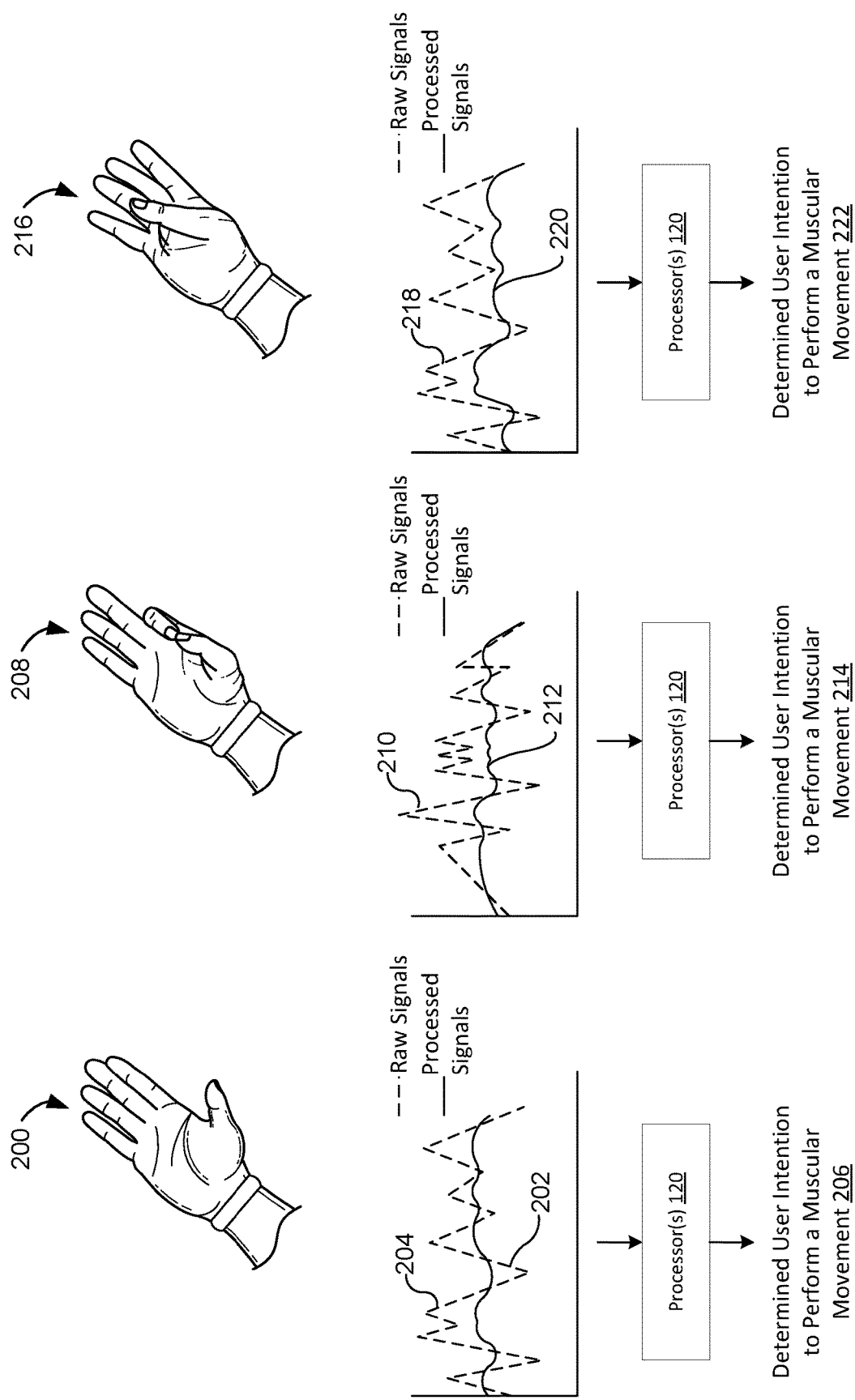
FIG. 2C illustrates an example in which the dry electrodes are used and internally process neuromuscular signals associated with in-air hand gestures provided via movements of the user's fingers and hands, in accordance with some embodiments.

FIG. 2C illustrates an example of how the dry electrodes (e.g., dry electrode 100) can be used to detect movements of fingers and hands, in accordance with some embodiments.

FIG. 2C shows a hand with three different orientations and three different raw signals measured via one or more dry electrodes. While three example hand orientations are shown, these are merely for example purposes and other hand orientations are also detectable. Specifically, FIG. 2C shows a first hand orientation 200 (e.g., a flat hand), and in response to that orientation, raw signals 202 are produced and subsequently detected by one or more dry electrodes. The electrical signal-processing component then produces a processed signal 204 based on the raw signals 202. The processed signal 204 is then sent to processor(s) 120 in order to determine a user intention to perform a muscular movement 206. FIG. 2C shows a second hand orientation 208 (e.g., a tip of an index finger and thumb tip making contact), and in response to that orientation, raw signals 210 are produced and subsequently detected by one or more dry electrodes. The electrical signal-processing component then produces a processed signal 212 based on the raw signals 210. The processed signal 212 is then sent to processor(s) 120 in order to determine a user intention to perform a muscular movement 214. FIG. 2C shows a third hand orientation 216 (e.g., moving a thumb to the palm of the hand), and in response to that orientation, raw signals 218 are produced and subsequently detected by one or more dry electrodes. The electrical signal-processing component then produces a processed signal 220 based on the raw signals 218. The processed signal 220 is then sent to processor(s) 120 in order to determine a user intention to perform a muscular movement 222.

Figure 3A:
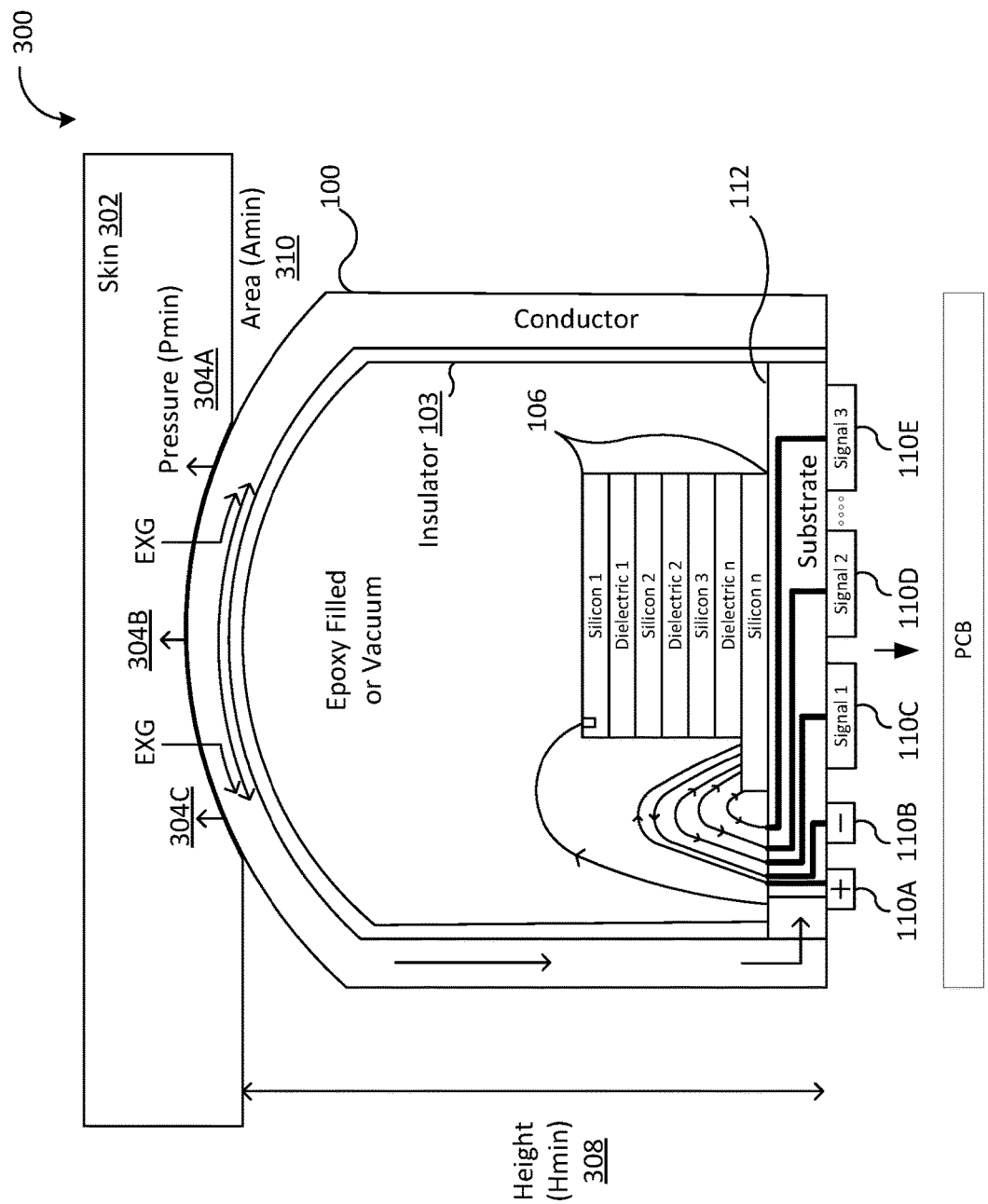
FIG. 3A illustrates another example cutaway of a dry electrode to further depict the signal routing and processing that can occur using internally housed components of a dry electrode 100, in accordance with some embodiments.

FIG. 3A illustrates another example cutaway of a dry electrode, in accordance with some embodiments. Diagram 300 illustrates a dry electrode 100, which was discussed above in reference to FIGS. 1A and 1B. FIG. 3A shows electrode 100 in contact with skin of a user 302 with a predefined minimum amount of pressure, e.g., as indicated by arrows 304A-304C (in embodiments in which a flat electrode is utilized, the minimum amount of pressure can be close to 0). The dry electrode 100 includes a conductive exterior surface 103 and an insulating interior surface to isolate the interior electrical signal-processing components 106. In some embodiments, the conductive surface can be made from a hard material (e.g., a conductive metal) and/or a soft material with an inner metal lining. Both material choices can benefit from utilization of forms of electromagnetic interference (EMI) shielding. The electrical signal-processing components 106, in some examples, are made of multiple silicon layers separated by a dielectric, which is described in detail in FIG. 3A. In some embodiments, the stacked silicon layers are produced from either a three-dimensional (3D) custom analog front-end (AFE) silicon stack and/or a 3D printed circuit board (PCB) silicon stack. In some embodiments, the remaining hollow interior portion can be filled with wither epoxy, and in other embodiments, the hollow interior portion is vacuum-sealed off In some embodiments, a seal is produced using a sealing layer 112 (e.g., a substrate), and the seal produced is a hermetic seal (e.g., no moisture ingression).

The conductive exterior surface 103 of the electrode 100 is configured to retrieve EXG signals, represented by arrows 306A-306D. In some embodiments, EXG signals include any number of different biometric signals that the dry electrode 100 can be configured to detect and partially process, e.g., electroencephalography (EEG) signal(s), electromyography (EMG) signal(s), electrooculography (EOG) signal(s), and electrocardiogram (ECG) signal(s), among other types of biometric signals. In the depicted example of FIG. 3A, the EXG signals are then passed to electrical signal-processing components 106 for processing.

As discussed above with respect to FIG. 1A, dry electrode 100 can include multiple terminals 110A-110D for passing (at least partially) processed signals to an external device (e.g., PCB 309 in FIG. 3A). FIG. 3A also shows that one or more additional terminals may be connected to the dry electrode 100, which is indicated by terminal 110E. In some embodiments, both the input and output signals are analog or digital or a combination thereof. In some embodiments, the terminals can include (i) one or more power terminals (positive terminal, negative terminal, and/or ground terminal); (ii) one or more common and/or reference signal input terminals (e.g., such as pseudodifferential configurations); (iii) one or more signal output terminals (e.g., (a) buffered signals, (b) buffered and filtered signals, (c) buffered, filtered, and amplified signals, and/or (d) buffered, filtered, and amplified signals and digitized signals (e.g., using a small power efficient ADC)); (iv) clock terminal input(s) for synchronizing between multiple channels (e.g., hardware triggered ADC sampling); and (v) one or more debugging terminals, which can be various power or I/O test points taken from various internal stages of the electronic circuit pipeline. In some embodiments, these debugging terminals can be accessed as electrode pads which can then be accessed on the external PCB where the dry electrodes are assembled.

In some embodiments, an ADC inside a dry electrode can be used as a memory buffer and allow for data to be gathered before waking the main processor, which reduces power consumption. In some embodiments, data is sent in batches (not in real time), depending on the application, to further reduce power consumption.

FIG. 3A also illustrates a minimum height depth 308 and a minimum area 310 for the example dry electrode 100 of FIG. 3A. A minimum volume is determined by multiplying the minimum height depth 308 and a minimum area 310 together. The minimum height depth 308 is proportional to the minimum area 310. Additionally, the minimum pressure, e.g., as indicated by arrows 304A-304C, is proportional to the minimum height depth 308. In some embodiments, the minimum pressure, e.g., as indicated by arrows 304A-304C, is proportional to one over the impedance (Zmax), and the minimum area 310 is proportional to one over the impedance (Zmax). In some embodiments, Zmax is proportional to one over the signal quality (SNR). In some embodiments, minimum height depth 308 is proportional to the SNR, the minimum area 310 is proportional to the SNR, and the minimum volume is proportional to the SNR.

Figure 3B:
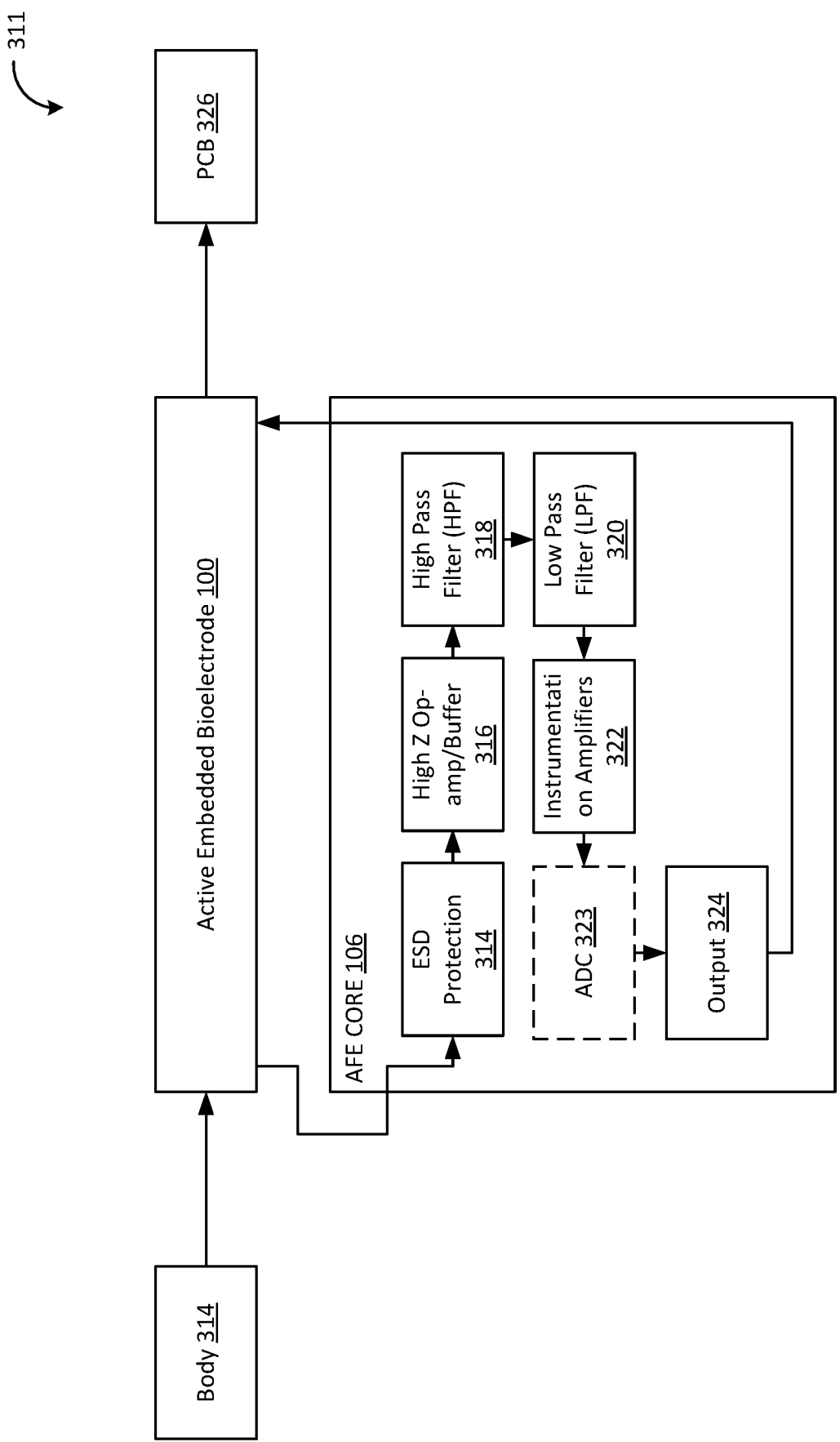
FIG. 3B is a block diagram illustrating how biometric signals are processed by an example dry electrode 100 and sent to one or more processors for further processing in conjunction with determining muscular activities of the user, in accordance with some embodiments.

Turning next to FIG. 3B, a block diagram 311 is illustrated to demonstrate how neuromuscular and/or other biometric signals are processed by the dry electrode, referred to also as an active embedded bioelectrode, and sent to one or more processors (which can be of an external device or can just be in a separate portion of a device that also includes the electrodes 100, e.g., a compute core portion of a wrist-wearable device can include these one or more processors which are separate from the individual electrodes 100 that can be circumferentially positioned around a watch or arm band), in accordance with some embodiments. FIG. 3B illustrates that neuromuscular signals, indicated by arrow 312, output by the body 314, are received/detected at the dry electrode 100. The dry electrode 100 includes an AFE core (e.g., electrical signal-processing component(s) 106 discussed in reference to FIGS. 1A-1B). The neuromuscular signals, after being received at the AFE core, are first passed through an electrostatic discharge (ESD) component 314 to filter out any unwanted electrostatic discharge. After the neuromuscular signals are passed through ESD component 314, the neuromuscular signals are passed through a high impedance operational amplifier and/or buffer 316, and then passed through both a high pass filter (HPF) 318 and low pass filter (LPF) 320. After the neuromuscular signals are passed through the low pass filter (LPF) 320, they are sent to one or more instrumentation amplifier(s) 322. In some embodiments, the neuromuscular signals are passed through an optional ADC 323. After being passed through the one or more instrumentation amplifier(s) 322 or the optional ADC 323, the neuromuscular signals are sent to an output component of the AFE core 106 and are then sent to a PCB 326 (e.g., an external or internal PCB). The PCB can include processor(s) 120 described reference to FIGS. 1A and 1B. In some embodiments, the PCB is made using a normal surface mount technology (SMT) process during the printed circuit board assembly (PCBA) or is made using a unique PCB footprint.

Figure 4:
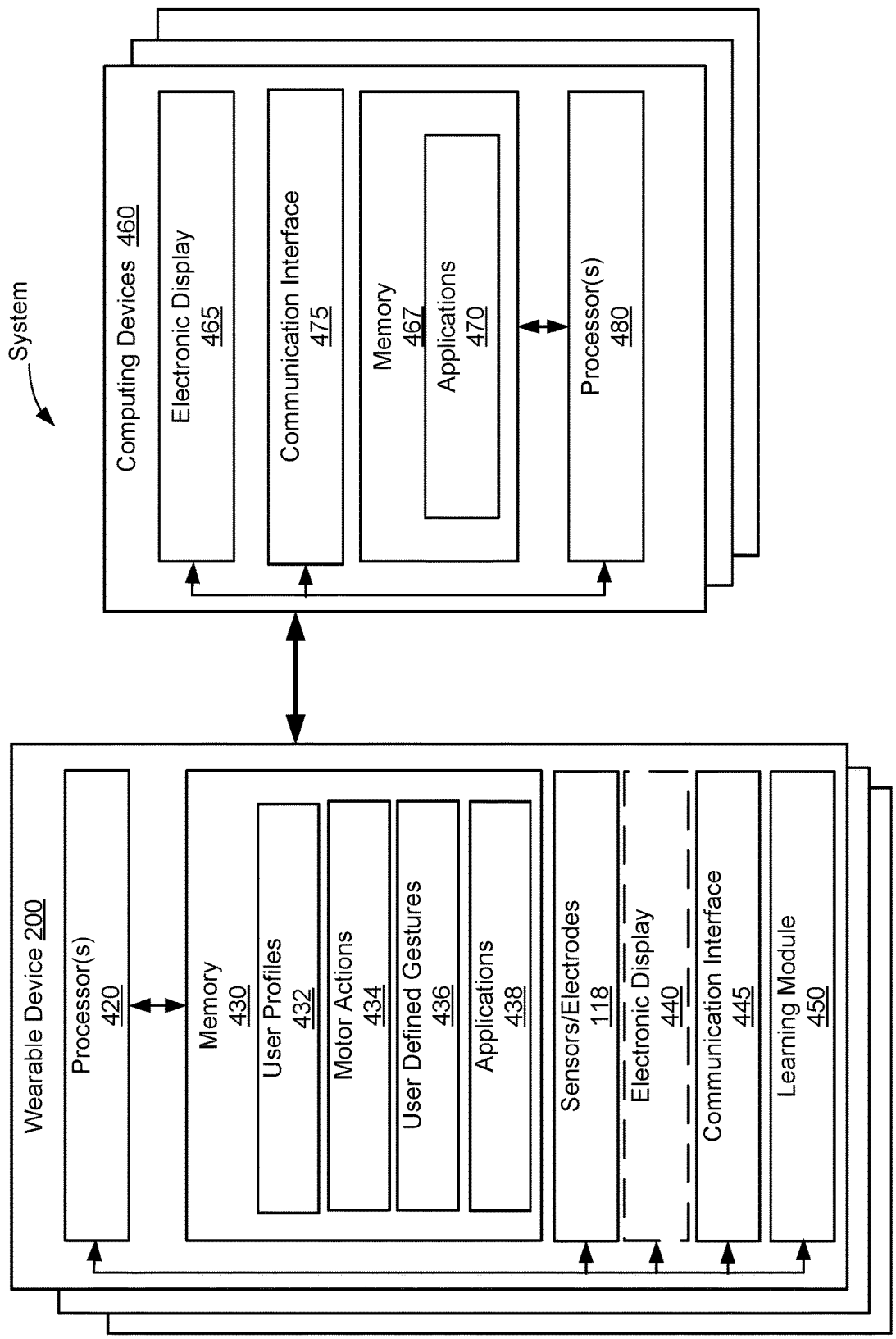
FIG. 4 is a block diagram illustrating a system including a wearable device, in accordance with various embodiments.

FIG. 4 is a block diagram illustrating a system 400 including a wearable device 200, in accordance with various embodiments. While some example features are illustrated, various other features have not been illustrated for the sake of brevity and so as not to obscure pertinent aspects of the example embodiments disclosed herein. To that end, as a non-limiting example, the system 400 includes one or more wearable devices 200 (sometimes referred to as "armbands," "wristbands," "arm-wearable devices," "wrist-wearable devices," or simply "apparatuses"), which can be used in conjunction with one or more computing devices 460. In some embodiments, the system 400 provides the functionality of a virtual-reality device, an augmented-reality device, a mixed-reality device, a hybrid-reality device, or a combination thereof. In some embodiments, the system 400 provides the functionality of a user interface and/or one or more user applications (e.g., games, word processors, messaging applications, calendars, clocks).

In some embodiments, the system 400 provides the functionality to control or provide commands to the one or more computing devices 460 based on a wearable device 200 determining motor actions or intended motor actions of the user. A motor action is an intended motor action when before the user performs the motor action or before the user completes the motor action, the detected neuromuscular signals travelling through the neuromuscular pathways can be determined to be the motor action. The one or more computing devices 460 include one or more of a head-mounted display, smartphones, tablets, smart watches, laptops, computer systems, augmented reality systems, robots, vehicles, virtual avatars, user interfaces, the wearable device 200, and/or other electronic devices and/or control interfaces.

The wearable device 200 includes a wearable structure worn by the user (e.g., the wearable device in FIGS. 1A-1B and 2A-2B). In some embodiments, the wearable device 200 collects information about a portion of the user's body (e.g., the user's hand(s) and finger(s) position(s) and orientation(s)) that can be used as input to perform one or more commands at the computing device 460. In some embodiments, the collected information about a portion of the user's body (e.g., the user's hand(s) and finger(s) position(s) and orientation(s)) can be used as input to perform one or more commands at the wearable device 200 (e.g., selecting content to present on the electronic display 440 of the wearable device 200 or controlling one or more applications 438 locally stored on the wearable device 200). The information collected about the portion of the user's body includes neuromuscular signals that can be used by the one or more processors 420 of the wearable device 200 to determine a motor action that the user intends to perform with their hand and/or fingers.

In the illustrated embodiment, the wearable device 200 includes one or more of the one or more processors 420, memory 430, sensors/electrodes 118 (and/or dry electrode 100 in FIG. 1A and/or dry electrodes 204A-204G in FIG. 2B), an optional electronic display 440, a communication interface 445, and a learning module 450. In some embodiments, the memory 430 includes one or more of user profiles 432, motor actions 434, user-defined gestures 436, and applications 438. The wearable device 200 may include additional components that are not shown in FIG. 4, such as a power source (e.g., an integrated battery, a connection to an external power source), a haptic feedback generator, etc. In some embodiments, one or more of the components shown in FIG. 4 are housed within a conductive hemispherical-like shape 102 (FIGS. 1A-1B) of the wearable device.

In some embodiments, the dry electrode 100 in FIG. 1A and dry electrodes 204A-204G in FIG. 2B include one or more hardware devices that contact the user's skin (e.g., wrist 202 of a user in FIG. 2A) and detect neuromuscular signals from neuromuscular pathways within and on wrist 202 of a user. The dry electrode 100 in FIG. 1A and dry electrodes 204A-204G in FIG. 2B are configured to detect different digit movements, wrist movements, arm movements, index finger movements, middle finger movements, ring finger movements, little finger movements, thumb movements, hand movements, etc. from the different neuromuscular signals detected from the user's skin. In some embodiments, the dry electrode 100 in FIG. 1A and dry electrodes 204A-204G in FIG. 2B are used in pairs to form respective channels for detecting neuromuscular signals. Each channel is a pair of sensors. In some embodiments, the wearable device 200 includes six pairs of sensors.

The one or more processors 420 are configured to receive the neuromuscular signals detected by the dry electrode 100 in FIG. 1A and dry electrodes 204A-204G in FIG. 2B and determine a motor action 434. In some embodiments, each motor action 434 is associated with one or more input commands. The input commands when provided to a computing device 460 cause the computing device to perform an action. Alternatively, in some embodiments the one or more input commands can be used to cause the wearable device 200 to perform one or more actions locally (e.g., present a display on the electronic display 440, operate one or more applications 438). For example, the wearable device 200 can be a smartwatch and the one or more input commands can be used to cause the smartwatch to perform one or more actions. In some embodiments, the motor action 434 and its associate input commands are stored in memory 430. In some embodiments, the motor actions 434 can include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module 450. Specifically, in some embodiments, the user can enter a training phase in which a user-defined gesture is associated with one or more input commands that when provided to a computing device 460 cause the computing device to perform an action. Similarly, the one or more input commands associated with the user-defined gesture can be used to cause the wearable device 200 to perform one or more actions locally. The user-defined gesture, once set, is stored in memory 430. Similar to the motor actions 434, the one or more processors 420 can use the neuromuscular signals detected by the dry electrode 100 in FIG. 1A and dry electrodes 204A-204G in FIG. 2B to determine that a user-defined gesture was performed by the user.

The one or more applications 438 stored in memory 430 can be productivity-based applications (e.g., calendars, organizers, word processors), social applications (e.g., social platforms), games, etc. In some embodiments, the one or more applications 438 can be presented to the user via the electronic display 440. In some embodiments, the one or more applications 438 are used to facilitate the transmission of information (e.g., to another application running on a computing device). In some embodiments, the user can provide one or more input commands based on the determined motor action to the applications 438 operating on the wearable device 200 to cause the applications 438 to perform the input commands. Additional information on one or more applications is provided below.

Additionally, different user profiles 432 can be stored in memory 430. The allows the wearable device 200 to provide user-specific performance. More specifically, the wearable device 200 can be tailored to perform as efficiently as possible for each user.

The communication interface 445 enables input and output to the computing device 460. In some embodiments, the communication interface 445 is a single communication channel, such as USB. In other embodiments, the communication interface 445 includes several distinct communication channels operating together or independently. For example, the communication interface 445 may include separate communication channels for sending input commands to the computing device 460 to cause the computing device 460 to perform one or more actions. In some embodiments, data from the dry electrode 100 in FIG. 1A and dry electrodes 204A-204G in FIG. 2B and/or the determined motor actions are sent to the computing device 460, which then interprets the appropriate input response based on the received data. The one or more communication channels of the communication interface 445 can be implemented as wired or wireless connections. In some embodiments, the communication interface 445 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

A computing device 460 presents media to a user. Examples of media presented by the computing device 460 include images, video, audio, or some combination thereof. Additional examples of media include executed virtual-reality applications and/or augmented-reality applications to process input data from the dry electrode 100 in FIG. 1A and dry electrodes 204A-204G in FIG. 2B on the wearable device 200. In some embodiments, the media content is based on received information from one or more applications 470 (e.g., productivity applications, social applications, games). The computing device 460 includes an electronic display 465 for presenting media content to the user. In various embodiments, the electronic display 465 comprises a single electronic display 465 or multiple electronic displays 465 (e.g., one display for each eye of a user). The computing device 460 includes a communication interface 475 that enables input and output to other devices in the system 400. The communication interface 475 is similar to the communication interface 445.

In some embodiments, the computing device 460 receives instructions (or commands) from the wearable device 200. In response to receiving the instructions, the computing device 460 performs one or more actions associated with the instructions (e.g., performs the one or more input commands in an augmented reality (AR) or virtual reality (VR) environment). Alternatively, in some embodiments, the computing device 460 receives instructions from an external device communicatively coupled to the wearable device 200 and, in response to receiving the instructions, performs one or more actions associated with the instructions. In some embodiments, the computing device 460 receives instructions from the wearable device 200 and, in response to receiving the instructions, provides the instruction to an external device communicatively coupled to the computing device 460 which performs one or more actions associated with the instructions. Although not shown, in the embodiments that include a distinct external device, the external device may be connected to the wearable device 200 and/or the computing device 460 via a wired or wireless connection. The external device may be remote game consoles, additional displays, additional head-mounted displays, and/or any other additional electronic devices that can be coupled with the wearable device 200 and/or the computing device 460.

In some embodiments, the computing device 460 provides information to the wearable device 200, which in turn causes the wearable device to present the information to the user. The information provided by the computing device 460 to the wearable device 200 can include media content (which can be displayed on the electronic display 440 of the wearable device 200), organizational data (e.g., calendars, phone numbers, invitations, directions), and files (such as word processing documents, spreadsheets, or other documents that can be worked on locally from the wearable device 200).

The computing device 460 can be implemented as any kind of computing device, such as an integrated system-on-a-chip, a microcontroller, a desktop or laptop computer, a server computer, a tablet, a smartphone, or other mobile device. Thus, the computing device 460 includes components common to typical computing devices, such as a processor, random access memory, a storage device, a network interface, an I/O interface, and the like. The processor may be or include one or more microprocessors or application specific integrated circuits (ASICs). The memory 467 may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long-term storage of data or instructions in the computing device. The storage device may take the form of a magnetic or solid-state disk, tape, CD, DVD, or other reasonably high-capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 4, the computing device 460 further includes applications 470. In some embodiments, the applications 470 are implemented as software modules that are stored on the storage device and executed by the processor 480. Some embodiments of the computing device 460 include additional or different components than those described in conjunction with FIG. 4. Similarly, the functions further described below may be distributed among components of the computing device 460 in a different manner than is described here.

Each application 470 is a group of instructions that, when executed by a processor, generates specific content for presentation to the user. For example, an application 470 can include a virtual-reality application that generates virtual-reality content (such as a virtual-reality environment) and that further generates virtual-reality content in response to inputs received from the wearable devices 200 (based on determined user motor actions). Examples of virtual-reality applications include gaming applications, conferencing applications, and video playback applications. Additional examples of applications 470 can include productivity-based applications (e.g., calendars, organizers, word processors), social-based applications (e.g., social media platforms, dating platforms), entertainment (e.g., shows, games, movies), and travel (e.g., ride-share applications, hotel applications, airline applications).

In some embodiments, the computing device 460 allows the applications 470 to operate in conjunction with the wearable device 200. In some embodiments, the computing device 460 receives information from the dry electrode 100 in FIG. 1A and dry electrodes 204A-204G in FIG. 2B of the wearable device 200 and provides the information to an application 470. Based on the received information, the application 470 determines media content to provide to the computing device 460 (or the wearable device 200) for presentation to the user via the electronic display 465 and/or a type of haptic feedback. For example, if the computing device 460 receives information from the dry electrode 100 in FIG. 1A and dry electrodes 204A-204G in FIG. 2B on the wearable device 200 indicating that the user has performed an action (e.g., performed a sword slash in a game, opened a file, typed a message), the application 470 generates content for the computing device 460 (or the wearable device 200) to present, the content mirroring the user's instructions based on determined motor actions by the wearable device 200. Similarly, in some embodiments, the applications 470 receive information directly from the dry electrode 100 in FIG. 1A and dry electrodes 204A-204G in FIG. 2B on the wearable device 200 (e.g., applications locally saved to the wearable device 200) and provide media content to the computing device 460 for presentation to the user based on the information (e.g., determined motor actions by the wearable device 200).

Figure 5A:
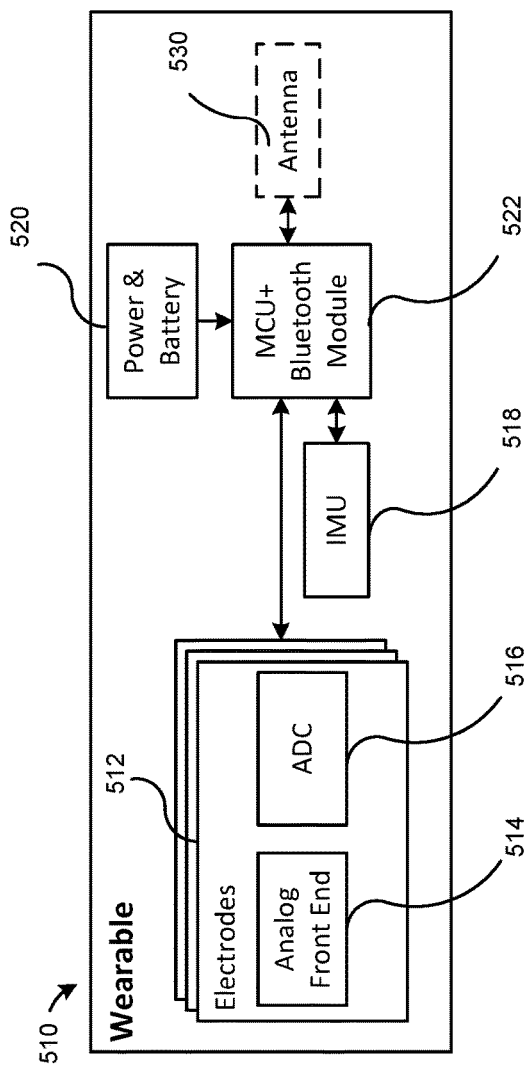
FIG. 5A illustrates a block diagram of the wearable device 510, in accordance with some embodiments.
Figure 5B:
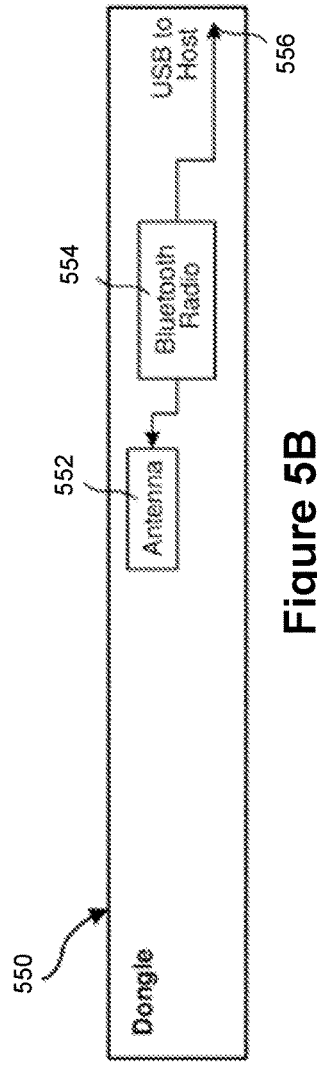
FIG. 5B illustrates a block diagram of the dongle portion 550, in accordance with some embodiments.

FIGS. 5A and 5B illustrate block diagrams of one or more internal components of an apparatus that may include one or more neuromuscular sensors (e.g., dry electrode 100 in FIG. 1A and dry electrodes 204A-204G in FIG. 2B), such as EMG sensors. The apparatus may include a wearable device 510, which can be an instance of wearable device 200 described above in reference to FIGS. 2A-2B, and a dongle portion 550 (shown schematically in FIG. 5B) that may be in communication with the wearable device 510 (e.g., using BLUETOOTH or another suitable short-range wireless communication technology). In some embodiments, the function of the dongle portion 550 (e.g., a similar circuit as that shown in FIG. 5B) is integrated in a device. For example, the function of the dongle portion 550 may be included within a head-mounted device, allowing the wearable device 510 to communicate with the head-mounted device. Alternatively, or additionally, in some embodiments, the wearable device 510 is in communication with integrated communication devices (e.g., BLUETOOTH or another suitable short-range wireless communication technology), one or more electronic devices, augmented reality systems, computer systems, robots, vehicles, virtual avatars, user interfaces, etc. In some embodiments, the dongle portion 550 is optional.

FIG. 5A illustrates a block diagram of the wearable device 510, in accordance with some implementations. In some embodiments, the wearable device 510 includes one or more electrodes 512, an analog front end 514, an analog-to-digital converter (ADC) 516, one or more (optional) inertial measurement unit (IMU) sensors 518, a microcontroller (MCU) 522, a power supply 520, and an antenna 530. In some embodiments, the analog front end and/or the analog-to-digital converter (ADC) 516 are placed within (e.g., within an interior cavity of) the one or more sensors 512 (e.g., dry electrode 100 discussed in reference to FIGS. 1A-4).

The one or more sensors 512 can be an instance of the neuromuscular sensors or dry electrode 100 in FIG. 1A and dry electrodes 204A-204G in FIG. 2B described above in reference to FIGS. 1A and 2B. In some embodiments, each sensor 512 includes one or more electrodes (e.g., dry electrode 100 in FIG. 1A and dry electrodes 204A-204G in FIG. 2B) for detecting electrical signals originating from a body of a user (i.e., neuromuscular signals). In some embodiments, the sensor signals from the sensors 512 are provided to the analog front end 514. In some embodiments, the analog front end 514 is configured to perform analog processing (e.g., noise reduction, filtering) of the sensor signals. The processed analog signals are provided to the ADC 516, which converts the processed analog signals to digital signals. In some embodiments, the digital signals are further processed by one or more computer processors, such as the MCU 522. In some embodiments, the MCU 522 receives and processes signals from additional sensors, such as IMU sensors 518 or other suitable sensors. The output of the processing performed by the MCU 522 may be provided to the antenna 530 for transmission to the dongle portion 550 or other communicatively coupled communication devices. In some embodiments, the antenna 530 is not included with the wearable device for communicating to another device.

In some embodiments, the wearable device 510 includes or receives power from the power supply 520. In some embodiments, the power supply 520 includes a battery module or other power source.

FIG. 5B illustrates a block diagram of the dongle portion 550, in accordance with some embodiments. The dongle portion 550 includes one or more of an antenna 552, a radio 554 (e.g., a BLUETOOTH radio (or other receiver circuit)), and a device output 556 (e.g., a USB output).

The antenna 552 is configured to communicate with the antenna 530 associated with wearable device 510. In some embodiments, communication between antennas 530 and 552 occurs using any suitable wireless technology and protocol, non-limiting examples of which include radiofrequency signaling and BLUETOOTH. In some embodiments, the signals received by antenna 552 of dongle portion 550 are received by the radio 554 and provided to a host computer through the device output 556 for further processing, display, and/or effecting control of a particular physical or virtual object or objects.

In some embodiments, the dongle portion 550 is inserted, via the device output 556, into a separate computer device (e.g., a laptop, phone, computer, tablet) that may be located within the same environment as the user, but not carried by the user. This separate computer may receive control signals from the wearable device 510 and further process these signals to provide a further control signal to one or more devices, such as a head-mounted device or other devices identified in FIG. 5A. For example, the control signals provided to the separate computer device may trigger the head-mounted device to modify the artificial reality view or perform one or more commands based on a sequence or a pattern of signals provided by the user (and detected by the one or more sensors 512). In some embodiments, the dongle portion 550 (or equivalent circuit in a head-mounted device or other device) may be network-enabled, allowing communication with a remote computer (e.g., a server, a computer) through the network. In some embodiments, the remote computer may provide control signals to the one or more devices to trigger the one or more devices to perform one or more commands (e.g., modify the artificial reality view). In some embodiments, the dongle portion 550 is inserted into the one or more devices to improve communications functionality. In some embodiments, when the dongle portion 550 is inserted into the one or more devices, the one or more devices perform further processing (e.g., modification of the AR image) based on the control signal received from the wearable device 510.

In some embodiments, the dongle portion 550 is included in the one or more devices (e.g., a head-mounted device, such as an artificial reality headset). In some embodiments, the circuit described above in FIG. 5B is provided by (i.e., integrated within) components of the one or more devices. In some embodiments, the wearable device 510 communicates with the one or more devices using the described wireless communications, and/or a similar schematic circuit, or a circuit having similar functionality.

In some embodiments, a method of manufacturing comprises manufacturing a dry electrode shell and applying an insulating material and a conductive lining to the interior surface of the shell, where the interior surface of the shell is accessible through an open end of the shell. The method of manufacturing comprises manufacturing one or more electrical signal-processing components (e.g., AFE core on a substrate or micro-board). The method of manufacturing comprises inserting the one or more electrical signal-processing components into the interior of the shell with an insulating material and coupling the one or more electrical signal-processing components to the conductive lining. In some embodiments, the method of manufacturing comprises placing an epoxy substance into the interior of the shell and sealing the open end of the shell by placing a substrate in the open end of the shell. In another alternative step, the method of manufacturing comprises creating a vacuum in the interior of the shell and sealing the open end of the shell by placing a substrate in the open end of the shell. In some embodiments, the substrate includes the one or more electrical signal-processing components.

Figure 6:
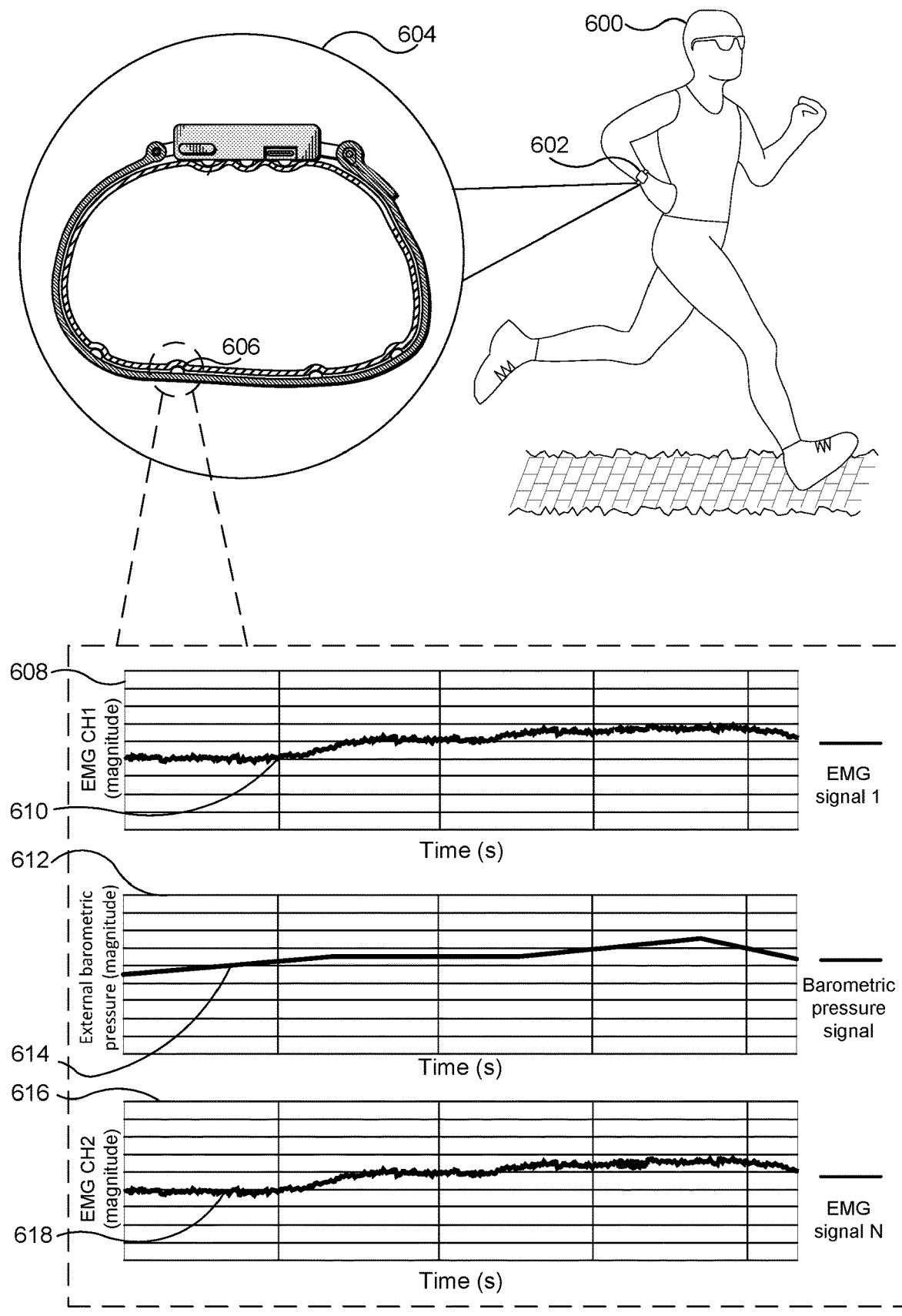
FIG. 6 illustrates a single dry electrode that is configured to record multiple distinct biometric and non-biometric readings, in accordance with some embodiments.

FIG. 6 illustrates a single dry electrode that is configured to record multiple distinct biometric and non-biometric readings, in accordance with some embodiments. FIG. 6 shows a user 600 wearing a wearable device 602 (also referred to as wearable device 200) while exercising, and FIG. 6 also shows an exploded-cross-sectional view 604 of the wearable device 602 being worn by the user 600. The exploded-cross-sectional view 604 shows that the wearable device 602 has multiple dry electrodes. The exploded-cross-section view highlights a single dry electrode 606, and shows its corresponding recorded multiple distinct readings over time. The first graph 608 shows a first reading 610 indicating a first-channel electromyography (EMG) signal being received over time. The second graph 612 shows a second reading 614 indicating an external biometric pressure (e.g., a non-biometric signal) over time. The third graph 616 shows a third reading 618 indicating a second-channel electromyography (EMG) signal being received over time.

Figure 7A:
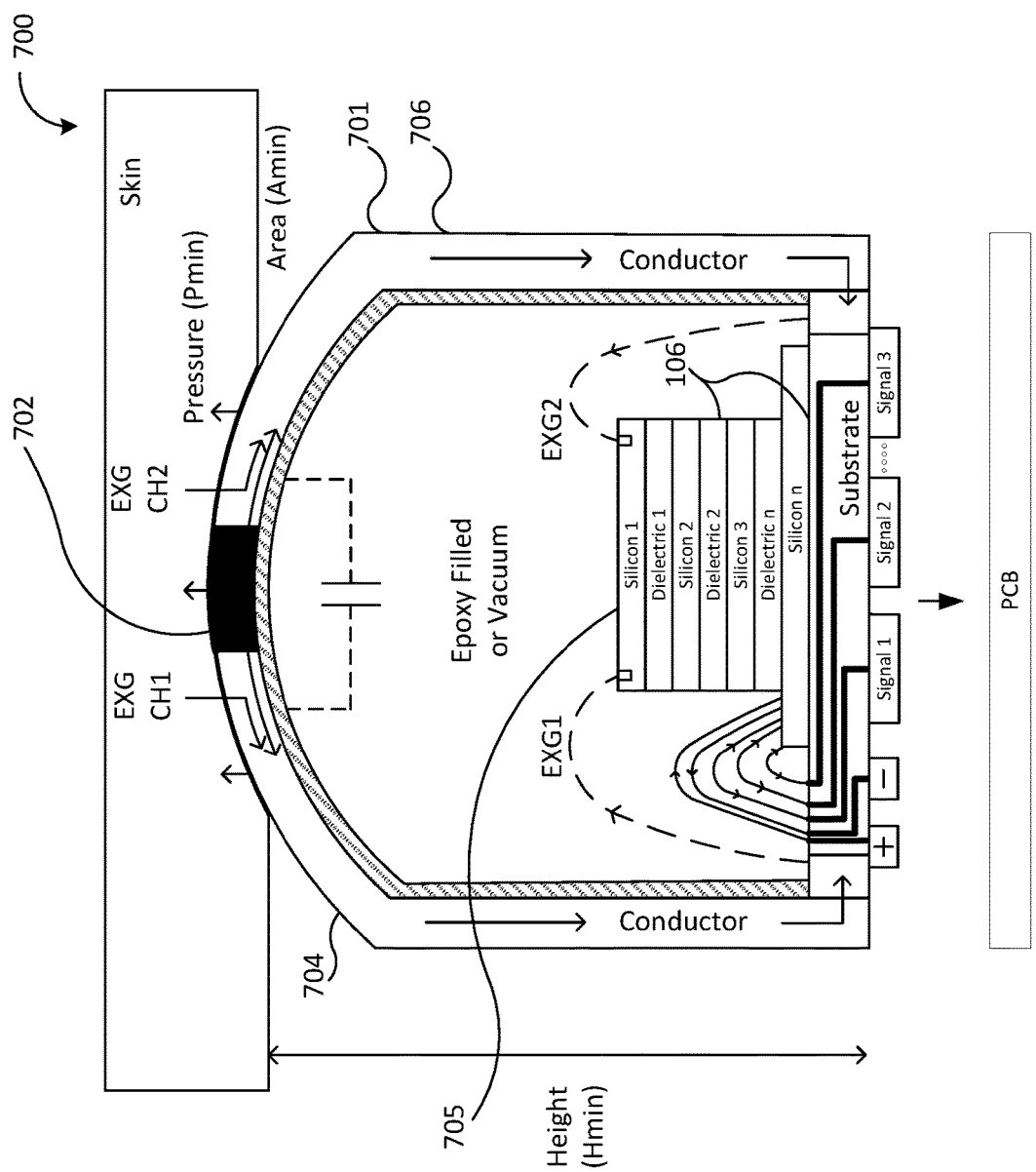
FIG. 7A illustrates another example cutaway of a dry electrode configured to record multiple EMG signals, in accordance with some embodiments.

FIG. 7A illustrates another example cutaway of a dry electrode configured to record multiple EMG signals, in accordance with some embodiments. Diagram 700 illustrates a dry electrode 701, similar to what was described in reference to FIG. 3A. Dry electrode 701 differs from dry electrode 300 discussed in reference to FIG. 3A in that dry electrode 701 is configured to record two separate EMG signal recordings (e.g., a dual-channel electrode). FIG. 7A shows a common mode capacitance 702 separating the first channel of the dry electrode 704 from the second channel of the dry electrode 706. FIG. 7A also shows one or more electrical signal-processing components 705 housed within a cavity of the dry electrode 706.

Figure 7B:
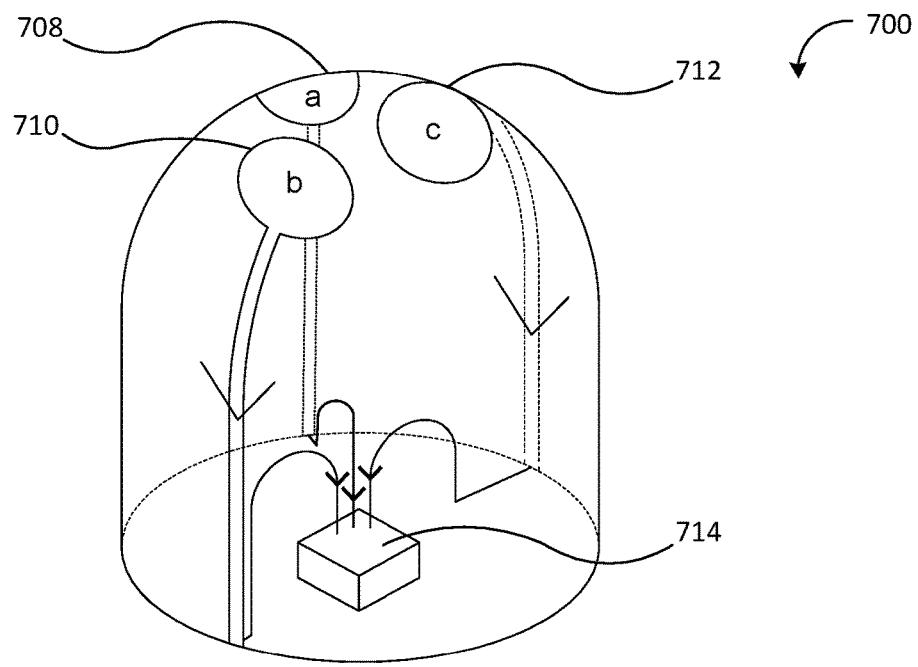
FIG. 7B illustrates another example dry electrode that includes multiple sensors integrated into a single dry electrode, in accordance with some embodiments.

FIG. 7B illustrates a perspective view 707 of another example dry electrode that includes multiple sensors integrated into a single dry electrode 700, in accordance with some embodiments. FIG. 7B shows a transparent view of the dry electrode 700 that illustrates three different sensors (first sensor 708 labeled as "(a)," second sensor 710 labeled as "(b)," and third sensor 712 labeled as "(c)") where these sensors are configured to receive their signals at an exterior surface of the dry electrode 700. Each of these different sensors is configured to be in communication with the electrical signal-processing circuitry 714.

Figures 7C, 7D:
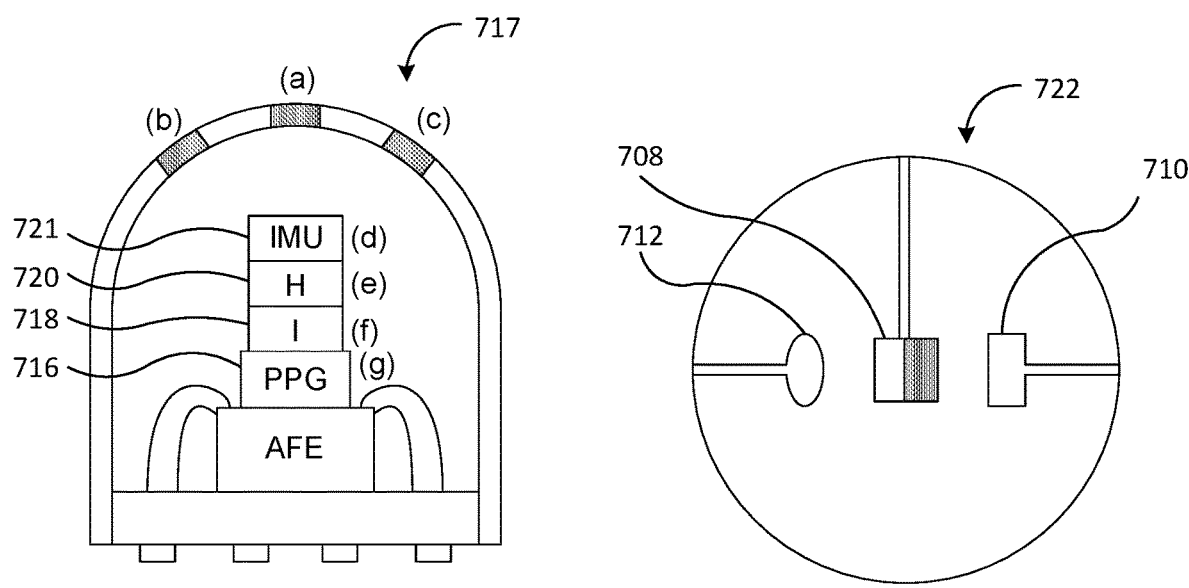
FIG. 7C shows a cross-sectional view of the dry electrode and further illustrates additional internal sensors that are each in communication with the electrical signal-processing circuitry, in accordance with some embodiments.
FIG. 7D illustrates a top-down view of the dry electrode, in accordance with some embodiments.

FIG. 7C shows a cross-sectional view 717 of the dry electrode 700 and further illustrates additional internal sensors (e.g., PPG sensor 716 labeled as "(g)," impedance sensor 718 labeled as "(f)," humidity sensor 720 labeled as "(e)," and an inertial measurement unit (IMU) sensor 721 labeled as "(d)") that are each in communication with the electrical signal-processing circuitry, in accordance with some embodiments. While the sensors labeled (a)-(g) can be part of a single dry electrode 700, other dry electrodes can be envisioned that include a subset of these listed sensors, or a greater number of sensors than the listed sensors. In some embodiments, redundant sensors can be included in the single dry electrode 700 to provide a more accurate signal reading.

FIG. 7D illustrates a top-down view 722 of the dry electrode 700, in accordance with some embodiments. The top-down view shows that the first sensor 708 labeled as "(a)" is a photoplethysmography (PPG) sensor, the second sensor 710 labeled as "(b)" is a temperature sensor, and third sensor 712 labeled as "(c)" is a pressure sensor.

Figure 8A:
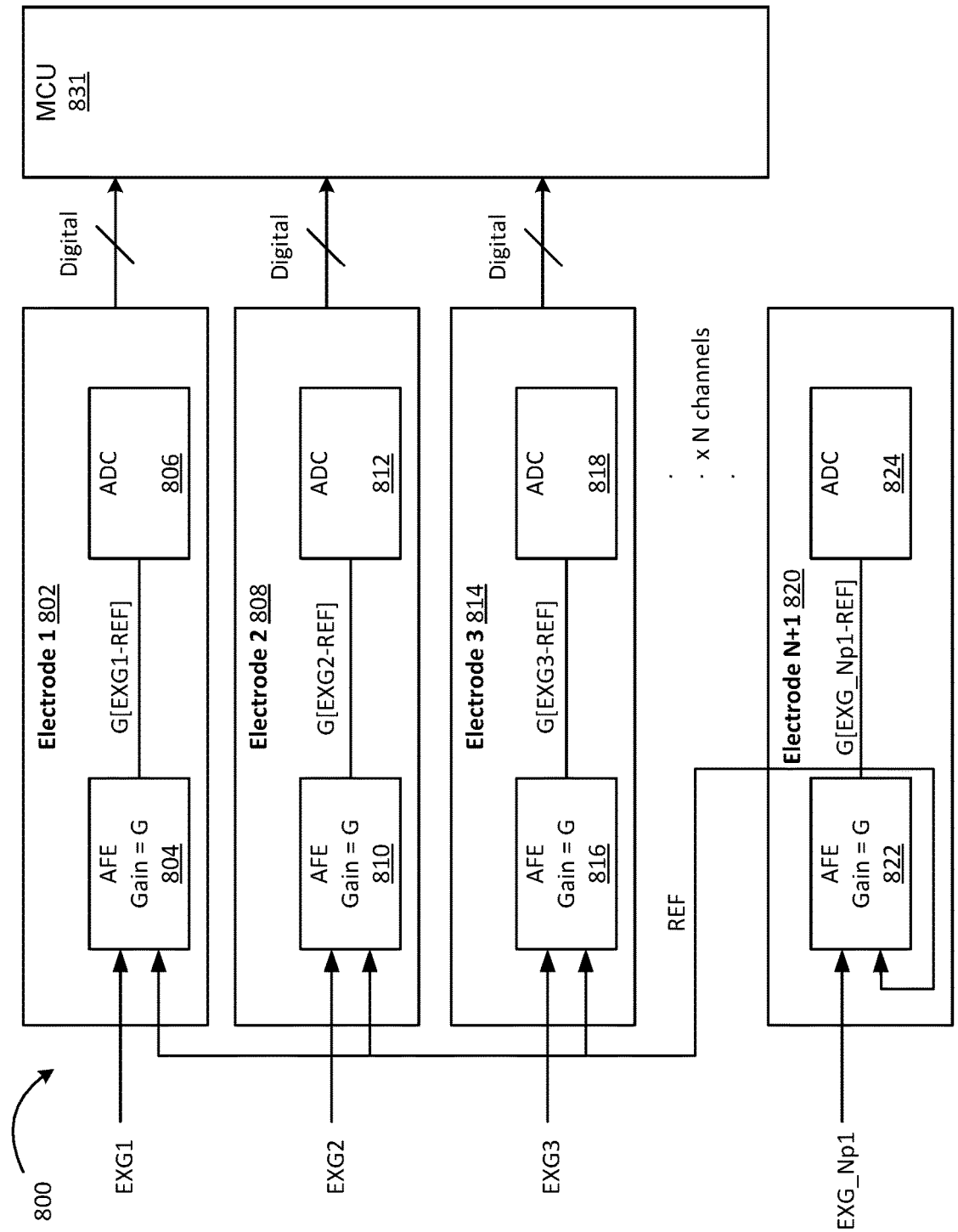
FIG. 8A is a schematic indicating multiple dry electrodes each having an integrated analog-to-digital converter (ADC) that is configured to perform pseudo-differential sensing, in accordance with some embodiments.

FIG. 8A illustrates a schematic indicating multiple dry electrodes each having an integrated analog-to-digital converter (ADC) that is configured to perform pseudo-differential sensing, in accordance with some embodiments. Schematic 800 shows an electrode 802, electrode 808, electrode 814, and electrode 820 that have an analog-front-end (AFE) 804, an AFE 810, AFE 816, and AFE 822, respectively. Each of the AFEs includes a specific gain and filter that is then followed by a respective ADC (ADC 808, ADC 812, ADC 818, and ADC 824). The AFE inside of each electrode is configured to take two inputs, one from its own respective dry electrode (e.g., EXG1 824. EXG2 826, EXG3 828, and EXG Np1 829), and the other from a common electrode labeled REF 831 in the schematic 800. The common electrode provides a reference signal shared among all dry electrodes. In some embodiments, the common electrode can include the same components, but with the analog-to-digital converter (ADC) powered down, and the AFE connected to the common electrode is different from the other sensing electrode AFEs. The advantage of this configuration is that ADC is integrated inside the electrodes. This achieves digital signal routings on-board, which can be much more immune to power-line interference and other external noise(s). FIG. 8A also shows that after each of the analog signals are converted to digital, each respective digital signal is passed to a processor (e.g., a microcontroller) indicated by box 831.

Figure 8B:
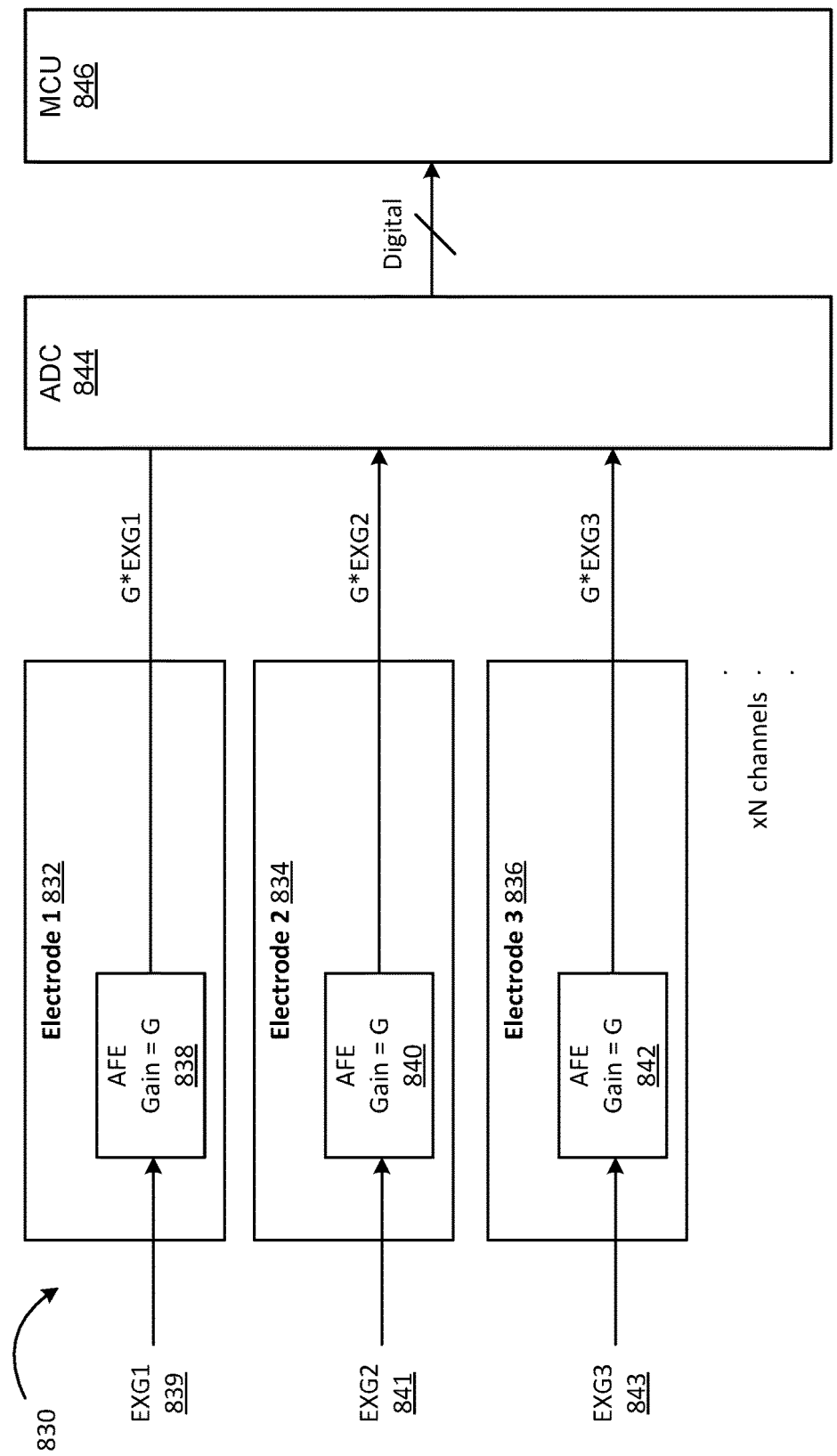
FIG. 8B is a schematic indicating multiple dry electrodes that share a discrete ADC, and the arrangement being configured to perform pseudo-differential sensing, in accordance with some embodiments.

FIG. 8B illustrates a schematic indicating multiple dry electrodes that share a discrete ADC, and the arrangement being configured to perform pseudo-differential sensing, in accordance with some embodiments. The schematic 830 shows an example pseudo-differential sensing system with electrode 832, electrode 834, and electrode 836 that have an analog-front-end (AFE) 838, an AFE 840, and AFE 842, respectively. Each of the AFEs includes a specific gain and filter. Unlike schematic 800, the electrode 832, electrode 834, and electrode 836 do not include an integrated ADC. The AFE inside each electrode takes input (e.g., EXG1 839. EXG2 841, and EXG3 843) directly from the sensing electrode at one terminal, and takes common mode on the other terminal. In this configuration, there is no common electrode in this configuration. As shown by ADC 844, the ADC is external to electrode 832, electrode 834, and electrode 836. In some embodiments, subtractions of signals among the channels are realized inside the ADC. The advantage of this configuration is that no additional electrode is needed for N-channel system. FIG. 8B also shows that after the analog signals are converted to a combined digital signal it is then passed to a processor (e.g., a microcontroller) indicated by box 846.

Figure 9A:
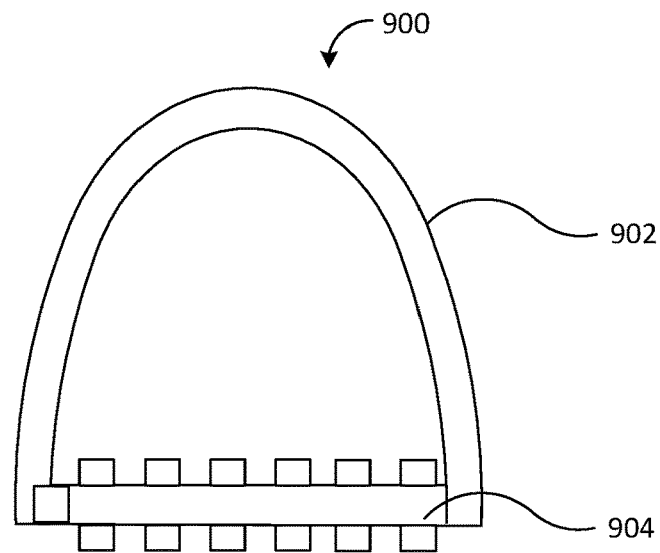
FIGS. 9A-9B illustrate two different dry electrode packaging techniques, in accordance with some embodiments.
Figure 9B:
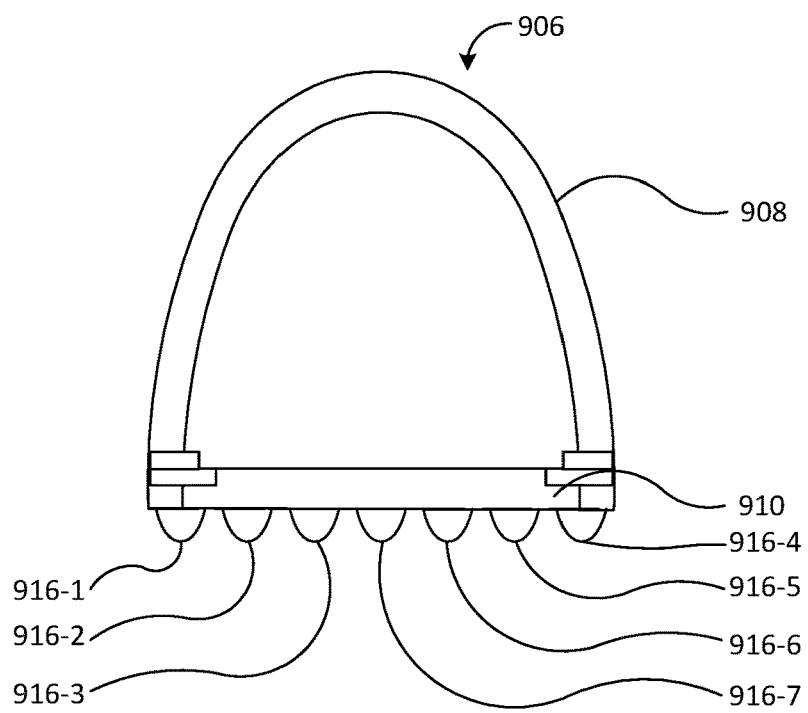

FIGS. 9A-9B illustrate two different dry electrode packaging techniques, in accordance with some embodiments. For the ease of explanation, FIGS. 9A-9B purposefully omit the internal computer and sensor components discussed in reference to earlier figures; however, these components are included. FIG. 9A illustrates a cross-section view 900 of a first dry electrode that is produced using a press-fit manufacturing technique. This technique involves pressing the electrode shell 902 onto a PCB 904. In this embodiment, the PCB is a double-sided PCB. The press-fit approach is suited for on-the-shelf fast prototyping.

FIG. 9B illustrates a cross-section of a second dry electrode 906 that is produced using solder joint as the bonding mechanism between the electrode shell 908 and the PCB 910. As shown in FIG. 9B, first solder joint 912 and a second solder joint 914 are shown in a cutaway indicating that the solder joint is a continuous strip that runs around the mating surfaces between the PCB 910 and the electrode shell 908. In some embodiments, the solder joint is not a continuous strip. In some embodiments, the PCB 910 has one or more ball grid array (BGA) pins 916-1 through 916-7 on the outer facing surface of the PCB 910.

Figure 10A:
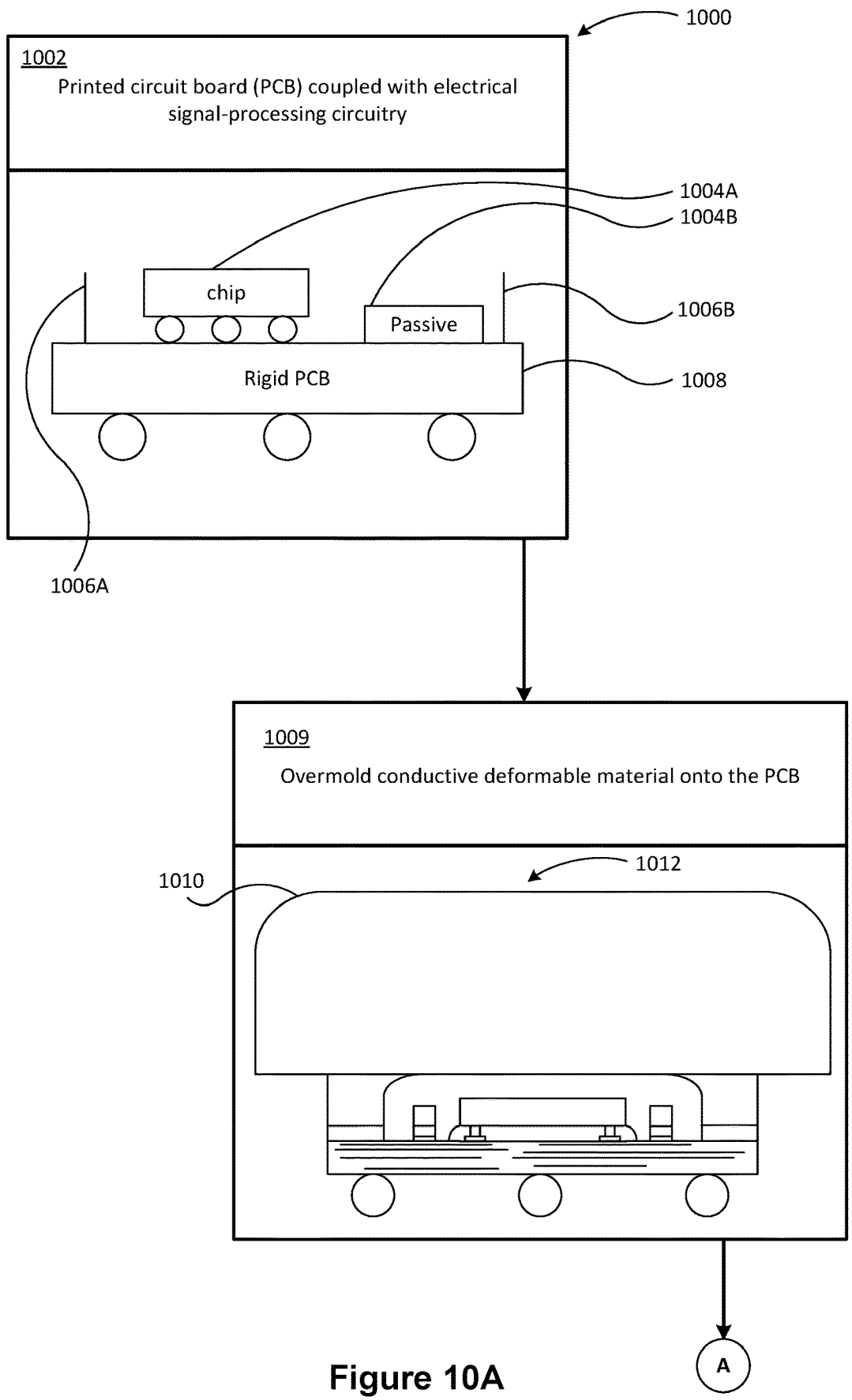
FIGS. 10A-10B illustrate a visual flow chart of how a dry electrode having a soft conductive surface is manufactured, in accordance with some embodiments.
Figure 10B:
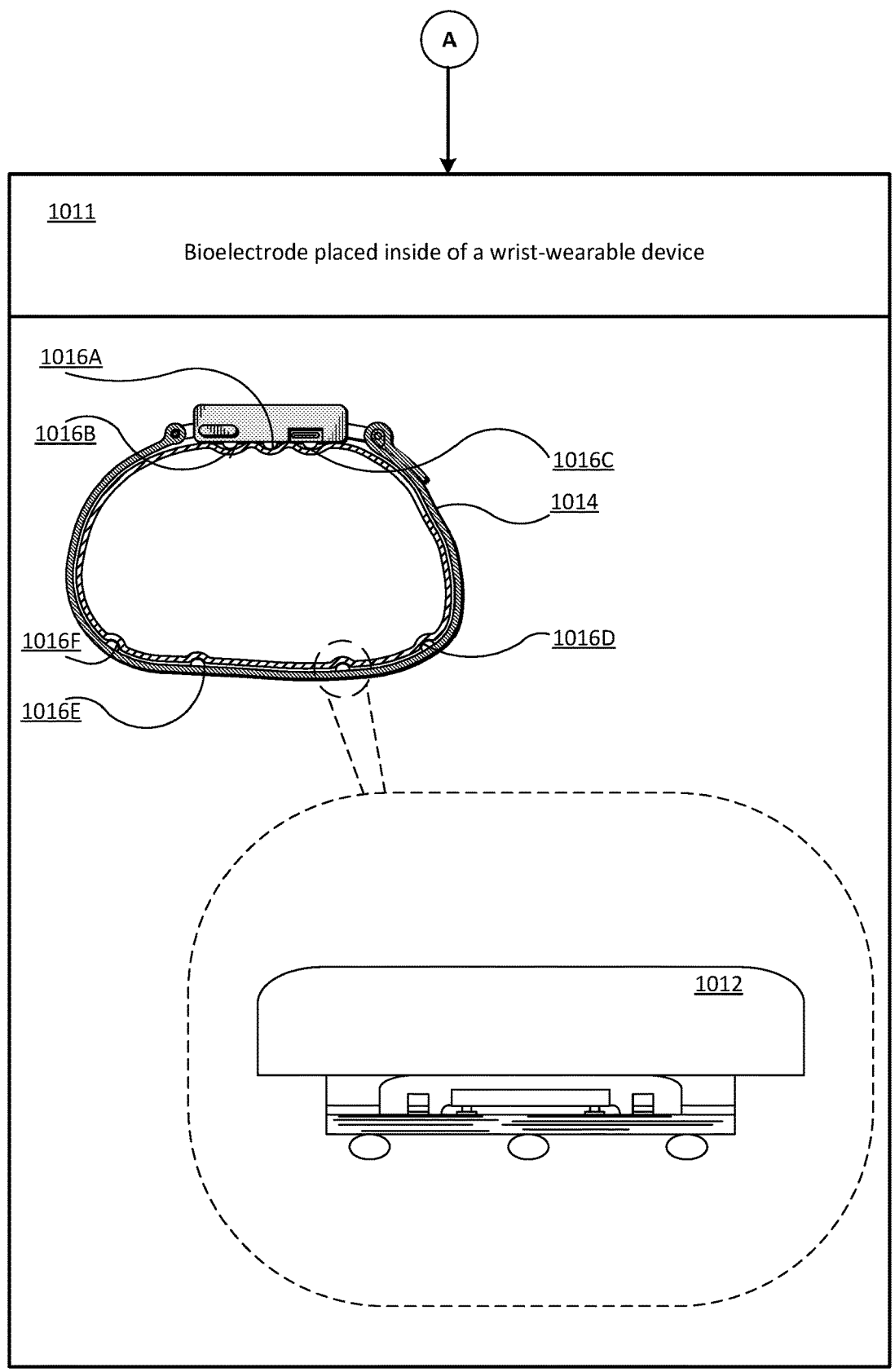

FIGS. 10A-10B illustrate a visual flow chart of how a dry electrode having a soft conductive surface is manufactured, in accordance with some embodiments. The flow chart 1000 includes a first pane 1002 that shows electrical signal-processing circuitry 1004A and 1004B and conductive prongs 1006A and 1006B for receiving signals coupled to a rigid PCB 1008 of a dry electrode. FIG. 10A also shows a second pane 1009 that shows a conductive deformable (e.g., soft elastomeric) material 1010 over-molded on top of the rigid PCB 1008 to produce a dry electrode having a soft conductive surface 1012. The conductive deformable material 1010 covers the entirety or substantially all of the electrical signal-processing circuitry 1004A and 1004B and conductive prongs 1006A and 1006B. FIG. 10B illustrates in another pane 1011 the dry electrode having a soft conductive surface 1012 placed within a wearable device 1014 (e.g., a wrist-wearable device). In some embodiments, multiple additional dry electrodes having soft conductive surfaces are placed within the wearable device (1016A-1016F).

Figure 11:
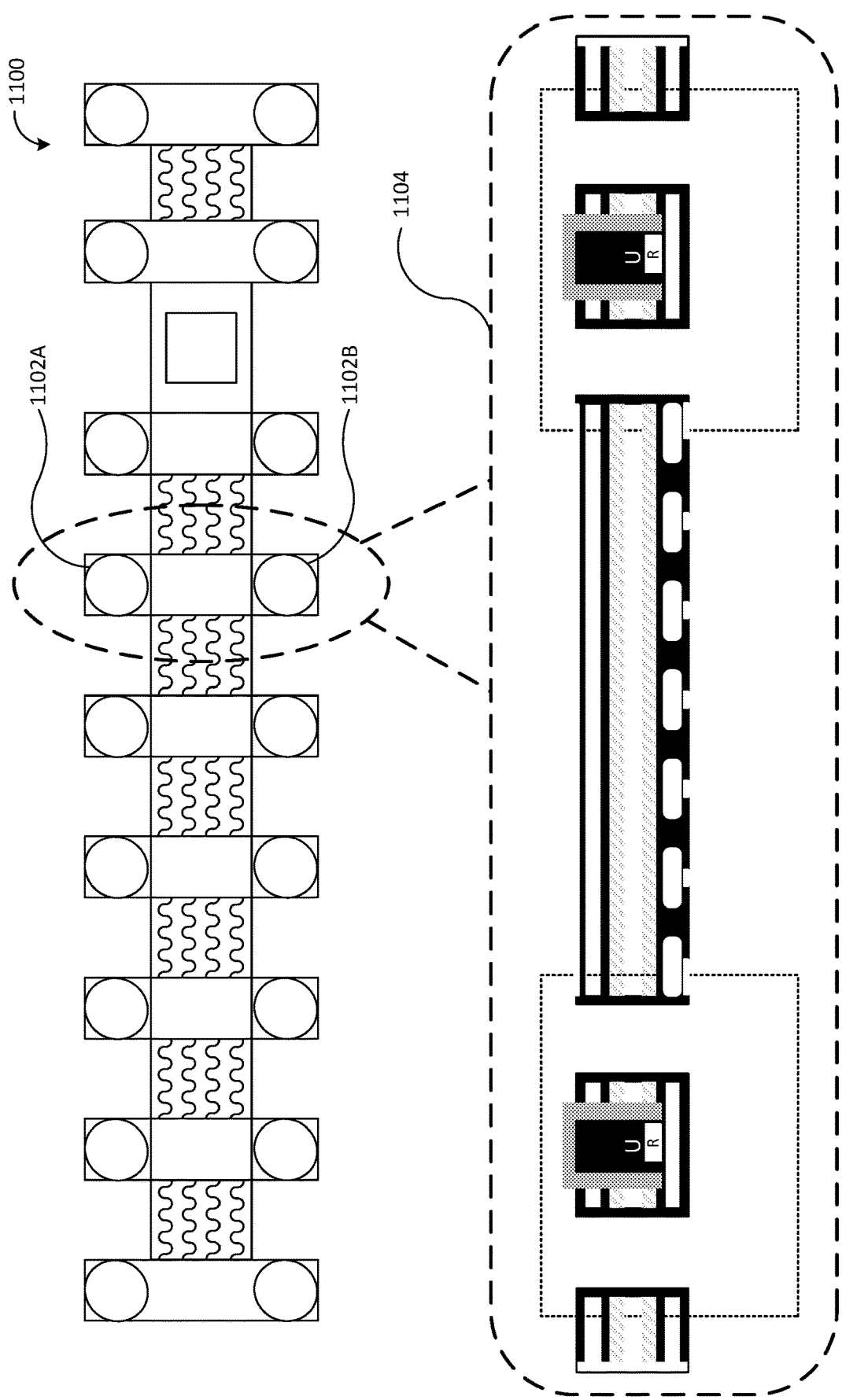
FIG. 11 illustrates multiple dry electrodes each having a soft conductive surface connected with each other for placement in a wearable device, in accordance with some embodiments.

FIG. 11 illustrates multiple dry electrodes each having a soft conductive surface connected with each other for placement in a wearable device, in accordance with some embodiments. FIG. 11 shows a top-down view 1100 of a band of electrodes interconnected partially by ribbon cables, where the band is configured to be inserted into a wrist-wearable device and worn around a wrist of a user. The top-down view 1100 shows that the electrodes 1102A and 1102B are included as a pair and can be used as a differential pair of electrodes. Cross-sectional view 1104 shows a cross-sectional view of the electrodes 1102A and 1102B. As shown in the cross-sectional view 1104, the electrode 1102A is in communication with the electrode 1102B, via one or more communication components, (e.g., a ribbon cable, an FPC, etc.).

Figure 12A:
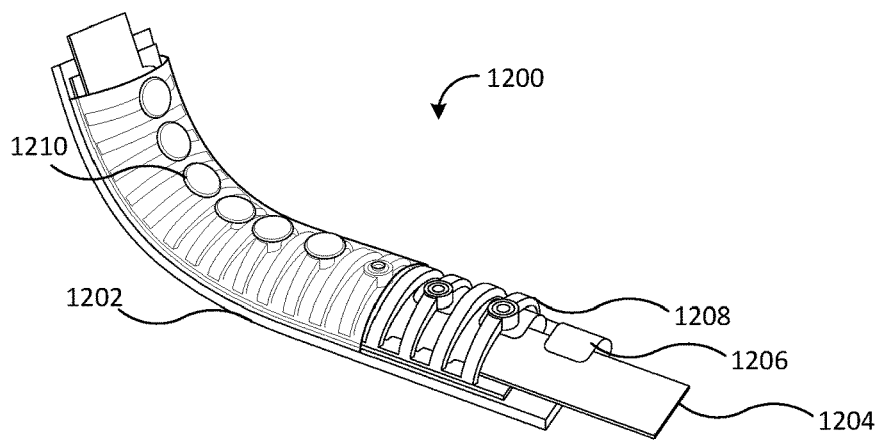
FIG. 12A illustrates an example band that incorporates multiple techniques for improving comfort of a wearable device, in accordance with some embodiments.

FIG. 12A illustrates an example band that incorporates multiple techniques for improving comfort of a wearable device, in accordance with some embodiments. FIG. 12A shows a band 1200 that includes elastic webbing 1202, an internal stiffener 1204, a conductive stand 1206, arch ribs 1208 for supporting an electrode 1210, and a conductive cover 1212 (not pictured). In some embodiments, internal stiffener 1204 is configured to give structure to the band 1200. In some embodiments, the stand is configured to be made of a material (e.g., a polyurethan substrate) that can bend when compressed onto a wrist of a user. In some embodiments, arch ribs 1208 are made of a material (e.g., elastomer) that can bend when compressed onto a wrist of a user. In some embodiments, both the soft electrodes discussed in reference to FIGS. 10A-11, and the other dry electrodes have a metal contact surface that can be placed in the band 1200. In some embodiments, the stand 1206 is made of a conductive material or includes conductive traces that route signals from the electrode to a signal-processing component.

Figure 12B:
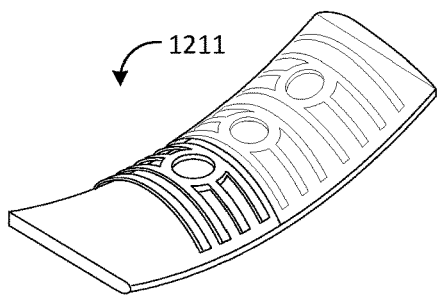
FIG. 12B illustrates an alternative arch rib for supporting an electrode, in accordance with some embodiments.

FIG. 12B illustrates alternative arch ribs 1211 for supporting an electrode, in accordance with some embodiments. In some embodiments, the band is completely covered and seals air to act as a further cushion when worn by a user.

Figure 12C:
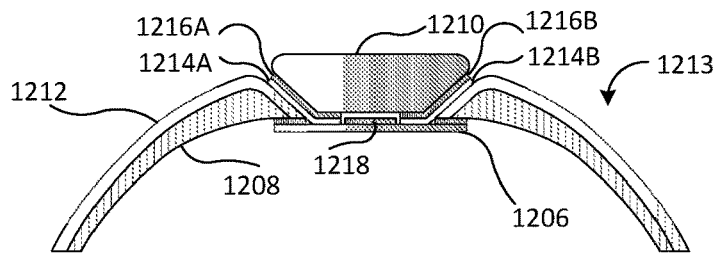
FIG. 12C illustrates a partial cross-sectional view of the band 1200 shown in FIG. 12A, in accordance with some embodiments.

FIG. 12C illustrates a partial cross-sectional view 1213 of the band 1200 shown in FIG. 12, in accordance with some embodiments. FIG. 12C shows the band 1200 having a conductive cover 1212, an arch rib 1208 for supporting an electrode 1210. FIG. 12C further shows that the electrode 1210 has a dielectric coating 1214A and 1214B, and the electrode with the dielectric coating (e.g., using a structural epoxy) is adhered to the conductive cover 1212. The band also includes a structural epoxy 1216A and 1216B. The electrode is further adhered, via a conductive epoxy 1218 to a stand 1206, which can be made of flexible printed circuit (or a flame retardant 4 (FR4) material) for transmitting received signals.

Figure 13:
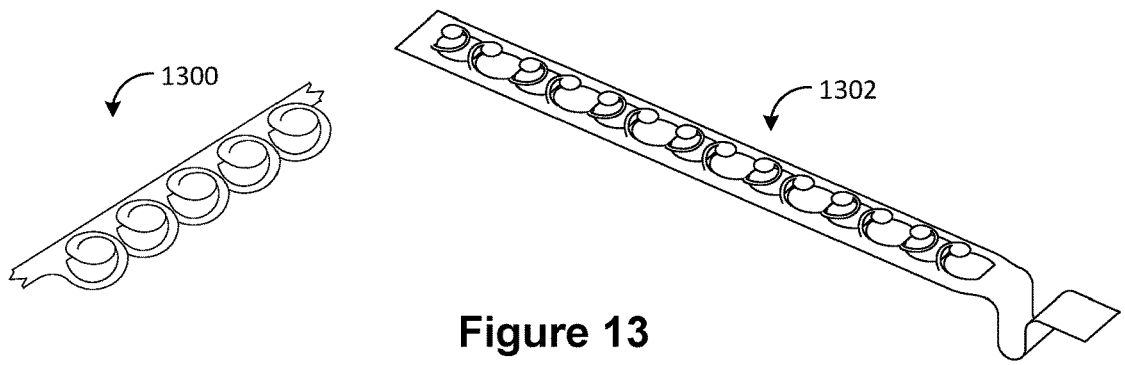
FIG. 13 illustrates alternative stands that act as springs for supporting an electrode, in accordance with some embodiments.

FIG. 13 illustrates alternative stands that act as springs for supporting an electrode, in accordance with some embodiments. FIG. 13 illustrates a first example spring mechanism 1300 and a second example spring mechanism 1302. The alternative stands also serves as a conductor for receiving the biometric signals.

Figure 14:
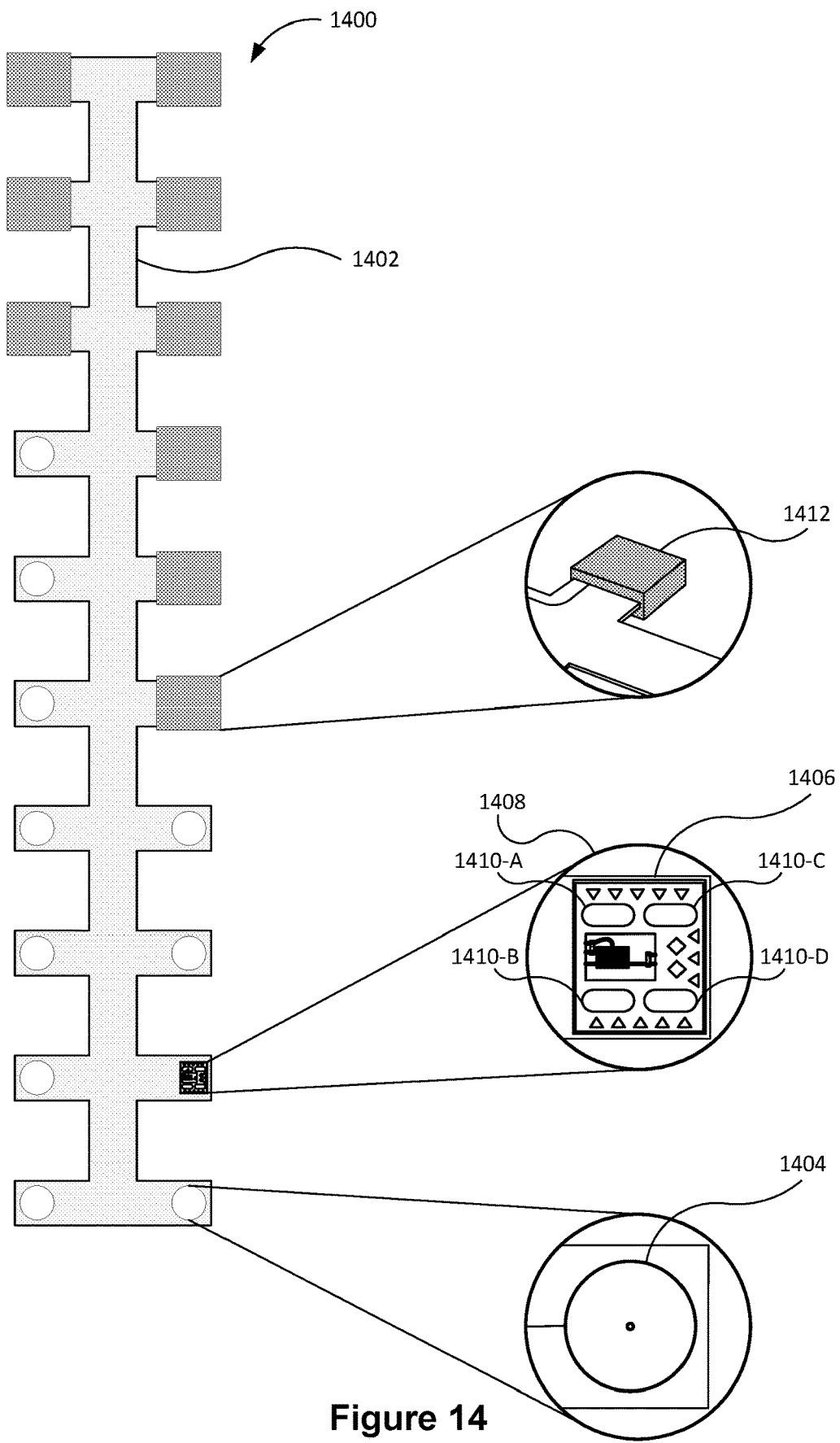
FIG. 14 illustrates a partially assembled flexible printed circuit (FPC) board that includes directly embedded overmolded soft electrodes, in accordance with some embodiments.

FIG. 14 illustrates a partially assembled flexible printed circuit (FPC) board 1400 that includes directly embedded over-molded soft electrodes, in accordance with some embodiments. FIG. 14 shows a ribbon cable 1402 with a plurality of embedded electrode contacts (e.g., AFEs) that are integrally formed with the ribbon cable 1402. In some embodiments, the embedded electrode contacts are of a first type 1404 and in other embodiments the electrode contacts are of a second type 1406. In some embodiments, the difference in types is based on different mounting methods of the over molded structure (which can also be made of a soft elastomeric material) onto the respective electrode contacts 1404 and 1406. As shown in exploded view 1408, the electrode contacts of the second type 1406 can include a plurality of cutouts 1410-A to 1410-D to further help with adhesion of the over molded structure. FIG. 14 also shows some of the electrode contacts already having an over molded soft elastomeric structure 1412 attached. While FIG. 14 shows that some of the electrode contacts are covered by soft elastomeric structures, it should be understood that the over-molding process can occur concurrently on each of electrode contacts during one step of a manufacturing process. In other words, the manufacturing process can be simplified by having two distinct steps (e.g., at a first manufacturing step, printing the flexible printed circuit (FPC) board and then, at a second manufacturing step, over-molding an elastomeric structure onto the electrode contact points that were printed in the first manufacturing step). In addition, while different types of electrode contacts (e.g., electrode contact of the first type 1404 and electrode contact of the second type 1406) are shown on the example ribbon cable 1402, the electrode contacts can, in other embodiments, be all of one type (e.g., all of the first type or all of the second type). In some embodiments, directly over-molding the soft elastomeric electrode contact 1402 onto the ribbon cable 1402 allows for a thinner wearable device that has the benefit of improving comfort of the wearable device (e.g., by reducing weight and bulkiness).

Numerous electrodes are described in this application and a non-limiting summary of dimensional ranges for these electrodes is described in the table below:

| Electrode Type | Dimension range in X direction (mm) | Dimension range in Y direction (mm) | Dimension range in Z direction (mm) | Weight range (g) × 100 | Area range (mm$^2$) |
|---|---|---|---|---|---|
| Metal Electrode | 4.0-6.0 | 4.0-6.0 | 4.0-6.0 | 40.0-60.0 | 12.6-28.3 |
| Round Soft Electrode | 3.0-5.0 | 3.0-5.0 | 1.0-2.0 | 2.1-4.1 | 7.0-19.7 |
| Pill Shape Soft Electrode | 2.9-4.9 | 2.5-4.5 | 0.6-2.7 | 1.4-3.4 | 7.0-20.0 |
| Narrow Pill Shape Soft Electrode | 4.5-6.5 | 1-3 | 0.6-2.7 | 1.4-3.4 | 6.0-18.0 |
| Embedded AFE in band FPC Soft Electrode | 4.7-6.7 | 4.1-6.1 | 1.0-3.0 | 1.4-4.1 | 20.0-40.0 |

Figure 15A:
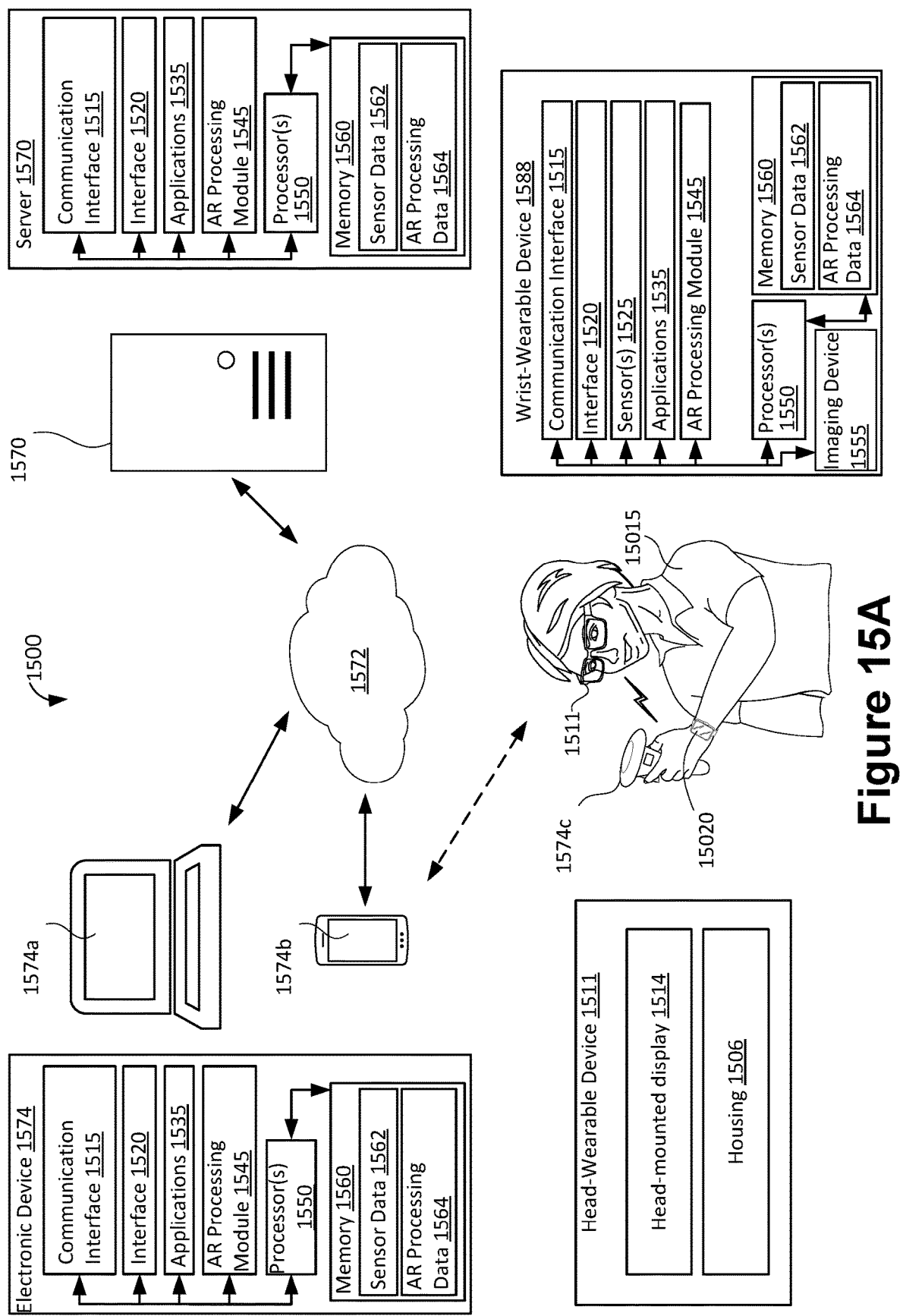
FIGS. 15A and 15B are block diagrams illustrating an example artificial-reality system (e.g., a system that includes one or more wearable devices that can each include various embodiments of the smart electrodes described herein), in accordance with some embodiments.
Figure 15B:
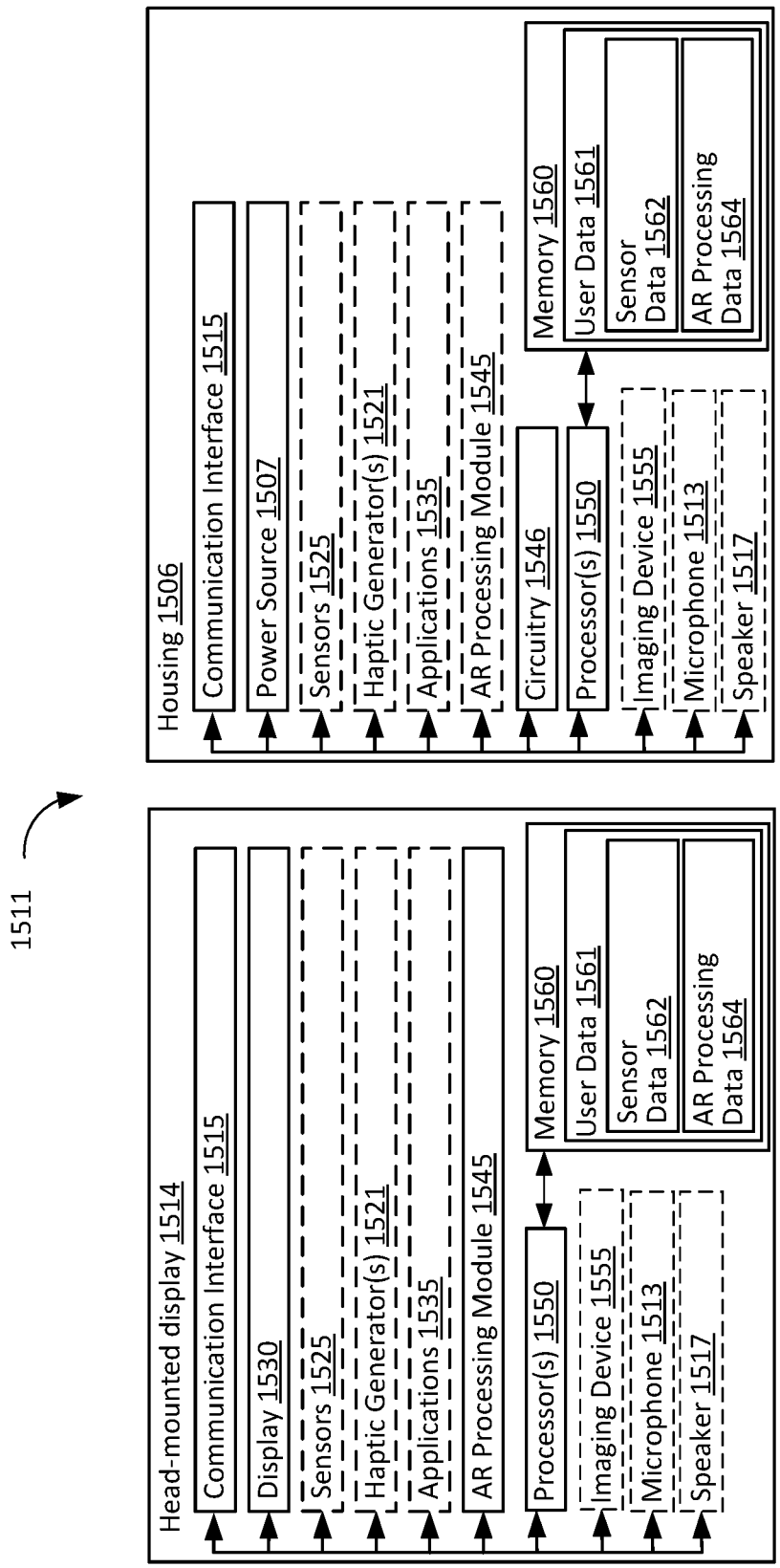

As noted earlier, systems can also be provided in which one or more wearable devices operate together to, e.g., allow users to interact with artificial-reality environments including by using embodiments of the smart electrodes described herein to sense gestures performed based on various muscle activations (e.g., at a user's hand or fingers, based on movement of a user's facial muscles, etc.). FIGS. 15A and 15B are block diagrams illustrating an example artificial-reality system, in accordance with some embodiments. The system 1500 includes one or more devices for facilitating an interactivity with an artificial-reality environment in accordance with some embodiments. For example, the head-wearable device 1511 can present to the user 15015 with a user interface within the artificial-reality environment. As a non-limiting example, the system 1500 includes one or more wearable devices, which can be used in conjunction with one or more computing devices. In some embodiments, the system 1500 provides the functionality of a virtual-reality device, an augmented-reality device, a mixed-reality device, hybrid-reality device, or a combination thereof. In some embodiments, the system 1500 provides the functionality of a user interface and/or one or more user applications (e.g., games, word processors, messaging applications, calendars, clocks, etc.).

The system 1500 can include one or more of servers 1570, electronic devices 1574 (e.g., a computer, 1574a, a smartphone 1574b, a controller 1574c, and/or other devices), head-wearable devices 1511 (e.g., an AR system or a VR system), and/or wrist-wearable devices 1588 (e.g., the wrist-wearable device 15020). In some embodiments, the one or more of servers 1570, electronic devices 1574, head-wearable devices 1511, and/or wrist-wearable devices 1588 are communicatively coupled via a network 1572. In some embodiments, the head-wearable device 1511 is configured to cause one or more operations to be performed by a communicatively coupled wrist-wearable device 1588, and/or the two devices can also both be connected to an intermediary device, such as a smartphone 1574b, a controller 1574c, or other device that provides instructions and data to and between the two devices. In some embodiments, the head-wearable device 1511 is configured to cause one or more operations to be performed by multiple devices in conjunction with the wrist-wearable device 1588. In some embodiments, instructions to cause the performance of one or more operations are controlled via an artificial-reality processing module 1545. The artificial-reality processing module 1545 can be implemented in one or more devices, such as the one or more of servers 1570, electronic devices 1574, head-wearable devices 1511, and/or wrist-wearable devices 1588. In some embodiments, the one or more devices perform operations of the artificial-reality processing module 1545, using one or more respective processors, individually or in conjunction with at least one other device as described herein. In some embodiments, the system 1500 includes other wearable devices not shown in FIG. 15A and FIG. 15B, such as rings, collars, anklets, gloves, and the like.

In some embodiments, the system 1500 provides the functionality to control or provide commands to the one or more computing devices 1574 based on a wearable device (e.g., head-wearable device 1511 or wrist-wearable device 1588) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1560. Similar to the motor actions, the one or more processors 1550 can use the detected neuromuscular signals by the one or more sensors 1525 to determine that a user-defined gesture was performed by the user.

The electronic devices 1574 can also include a communication interface 1515, an interface 1520 (e.g., including one or more displays, lights, speakers, and haptic generators), one or more sensors 1525, one or more applications 1535, an artificial-reality processing module 1545, one or more processors 1550, and memory 1560. The electronic devices 1574 are configured to communicatively couple with the wrist-wearable device 1588 and/or head-wearable device 1511 (or other devices) using the communication interface 1515. In some embodiments, the electronic devices 1574 are configured to communicatively couple with the wrist-wearable device 1588 and/or head-wearable device 1511 (or other devices) via an application programming interface (API). In some embodiments, the electronic devices 1574 operate in conjunction with the wrist-wearable device 1588 and/or the head-wearable device 1511 to determine a hand gesture and cause the performance of an operation or action at a communicatively coupled device.

The server 1570 includes a communication interface 1515, one or more applications 1535, an artificial-reality processing module 1545, one or more processors 1550, and memory 1560. In some embodiments, the server 1570 is configured to receive sensor data from one or more devices, such as the head-wearable device 1511, the wrist-wearable device 1588, and/or electronic device 1574, and use the received sensor data to identify a gesture or user input. The server 1570 can generate instructions that cause the performance of operations and actions associated with a determined gesture or user input at communicatively coupled devices, such as the head-wearable device 1511.

The head-wearable device 1511 includes smart glasses (e.g., the augmented-reality glasses), artificial reality headsets (e.g., VR/AR headsets), or other head worn device. In some embodiments, one or more components of the head-wearable device 1511 are housed within a body of the HMD 1514 (e.g., frames of smart glasses, a body of a AR headset, etc.). In some embodiments, one or more components of the head-wearable device 1511 are stored within or coupled with lenses of the HMD 1514. Alternatively or in addition, in some embodiments, one or more components of the head-wearable device 1511 are housed within a modular housing 1506. The head-wearable device 1511 is configured to communicatively couple with other electronic device 1574 and/or a server 1570 using communication interface 1515 as discussed above.

FIG. 15B describes additional details of the HMD 1514 and modular housing 1506 described above in reference to 15A, in accordance with some embodiments.

The housing 1506 include(s) a communication interface 1515, circuitry 1546, a power source 1507 (e.g., a battery for powering one or more electronic components of the housing 1506 and/or providing usable power to the HMD 1514), one or more processors 1550, and memory 1560. In some embodiments, the housing 1506 can include one or more supplemental components that add to the functionality of the HMD 1514. For example, in some embodiments, the housing 1506 can include one or more sensors 1525, an AR processing module 1545, one or more haptic generators 1521, one or more imaging devices 1555, one or more microphones 1513, one or more speakers 1517, etc. The housing 106 is configured to couple with the HMD 1514 via the one or more retractable side straps. More specifically, the housing 1506 is a modular portion of the head-wearable device 1511 that can be removed from head-wearable device 1511 and replaced with another housing (which includes more or less functionality). The modularity of the housing 1506 allows a user to adjust the functionality of the head-wearable device 1511 based on their needs.

In some embodiments, the communications interface 1515 is configured to communicatively couple the housing 1506 with the HMD 1514, the server 1570, and/or other electronic device 1574 (e.g., the controller 1574c, a tablet, a computer, etc.). The communication interface 1515 is used to establish wired or wireless connections between the housing 1506 and the other devices. In some embodiments, the communication interface 1515 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1506 is configured to communicatively couple with the HMD 1514 and/or other electronic device 1574 via an application programming interface (API).

In some embodiments, the power source 1507 is a battery. The power source 1507 can be a primary or secondary battery source for the HMD 1514. In some embodiments, the power source 1507 provides useable power to the one or more electrical components of the housing 1506 or the HMD 1514. For example, the power source 1507 can provide usable power to the sensors 1521, the speakers 1517, the HMD 1514, and the microphone 1513. In some embodiments, the power source 1507 is a rechargeable battery. In some embodiments, the power source 1507 is a modular battery that can be removed and replaced with a fully charged battery while it is charged separately.

The one or more sensors 1525 can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU)s. Additional non-limiting examples of the one or more sensors 1525 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1525 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 1525 can include location sensing devices (e.g., GPS) configured to provide location information. In some embodiment, the data measured or sensed by the one or more sensors 1525 is stored in memory 1560. In some embodiments, the housing 1506 receives sensor data from communicatively coupled devices, such as the HMD 1514, the server 1570, and/or other electronic device 1574. Alternatively, the housing 1506 can provide sensors data to the HMD 1514, the server 1570, and/or other electronic device 1574.

The one or more haptic generators 1521 can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1521 are hydraulic, pneumatic, electric, and/or mechanical actuators. In some embodiments, the one or more haptic generators 1521 are part of a surface of the housing 1506 that can be used to generate a haptic response (e.g., a thermal change at the surface, a tightening or loosening of a band, increase or decrease in pressure, etc.). For example, the one or more haptic generators 1525 can apply vibration stimulations, pressure stimulations, squeeze simulations, shear stimulations, temperature changes, or some combination thereof to the user. In addition, in some embodiments, the one or more haptic generators 1521 include audio generating devices (e.g., speakers 1517 and other sound transducers) and illuminating devices (e.g., light-emitting diodes (LED)s, screen displays, etc.). The one or more haptic generators 1521 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1535 include social-media applications, banking applications, health applications, messaging applications, web browsers, gaming application, streaming applications, media applications, imaging applications, productivity applications, social applications, etc. In some embodiments, the one or more applications 1535 include artificial reality applications. The one or more applications 1535 are configured to provide data to the head-wearable device 1511 for performing one or more operations. In some embodiments, the one or more applications 1535 can be displayed via a display 1530 of the head-wearable device 1511 (e.g., via the HMD 1514).

In some embodiments, instructions to cause the performance of one or more operations are controlled via an artificial reality (AR) processing module 1545. The AR processing module 1545 can be implemented in one or more devices, such as the one or more of servers 1570, electronic devices 1574, head-wearable devices 1511, and/or wrist-wearable devices 1570. In some embodiments, the one or more devices perform operations of the AR processing module 1545, using one or more respective processors, individually or in conjunction with at least one other device as described herein. In some embodiments, the AR processing module 1545 is configured process signals based at least on sensor data. In some embodiments, the AR processing module 1545 is configured process signals based on image data received that captures at least a portion of the user hand, mouth, facial expression, surrounding, etc. For example, the housing 1506 can receive EMG data and/or IMU data from one or more sensors 1525 and provide the sensor data to the AR processing module 1545 for a particular operation (e.g., gesture recognition, facial recognition, etc.). The AR processing module 1545, causes a device communicatively coupled to the housing 1506 to perform an operation (or action). In some embodiments, the AR processing module 1545 performs different operations based on the sensor data and/or performs one or more actions based on the sensor data.

In some embodiments, the one or more imaging devices 1555 can include an ultra-wide camera, a wide camera, a telephoto camera, a depth-sensing cameras, or other types of cameras. In some embodiments, the one or more imaging devices 1555 are used to capture image data and/or video data. The imaging devices 1555 can be coupled to a portion of the housing 1506. The captured image data can be processed and stored in memory and then presented to a user for viewing. The one or more imaging devices 1555 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 1555 is stored in memory 1560 (which can include volatile and non-volatile memory such that the image data and/or video data can be temporarily or permanently stored, as needed depending on the circumstances).

The circuitry 1546 is configured to facilitate the interaction between the housing 1506 and the HMD 1514. In some embodiments, the circuitry 1546 is configured to regulate the distribution of power between the power source 1507 and the HMD 1514. In some embodiments, the circuitry 746 is configured to transfer audio and/or video data between the HMD 1514 and/or one or more components of the housing 1506.

The one or more processors 1550 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1560. The memory 1560 may be or include random access memory (RAM), read-only memory (ROM), dynamic random-access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 1550. The memory 1560 also provides a storage area for data and instructions associated with applications and data handled by the processor 1550.

In some embodiments, the memory 1560 stores at least user data 1561 including sensor data 1562 and AR processing data 1564. The sensor data 1562 includes sensor data monitored by one or more sensors 1525 of the housing 1506 and/or sensor data received from one or more devices communicative coupled with the housing 1506, such as the HMD 1514, the smartphone 1574b, the controller 1574c, etc. The sensor data 1562 can include sensor data collected over a predetermined period of time that can be used by the AR processing module 1545. The AR processing data 1564 can include one or more one or more predefined camera-control gestures, user defined camera-control gestures, predefined non-camera-control gestures, and/or user defined non-camera-control gestures. In some embodiments, the AR processing data 1564 further includes one or more predetermined threshold for different gestures.

The HMD 1514 includes a communication interface 1515, a display 1530, an AR processing module 1545, one or more processors, and memory. In some embodiments, the HMD 1514 includes one or more sensors 1525, one or more haptic generators 1521, one or more imaging devices 1555 (e.g., a camera), microphones 1513, speakers 1517, and/or one or more applications 1535. The HMD 1514 operates in conjunction with the housing 1506 to perform one or more operations of a head-wearable device 1511, such as capturing camera data, presenting a representation of the image data at a coupled display, operating one or more applications 1535, and/or allowing a user to participate in an AR environment.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A dry electrode, comprising:
   a conductive exterior surface configured to contact skin of a user to receive one or more neuromuscular signals, the one or more neuromuscular signals configured to cause the user to perform a muscular movement;
   an interior surface disposed opposite to the conductive exterior surface, wherein the interior surface defines a volume of space configured to house one or more electrical signal-processing components; and
   a sealing layer configured to encapsulate the one or more electrical signal-processing components, wherein:
   the one or more electrical signal-processing components are configured to process the one or more neuromuscular signals to produce one or more processed neuromuscular signals; and
   the one or more electrical signal-processing components are also configured to provide the processed neuromuscular signals to one or more processors to allow, in part, the one or more processors to detect an intention of the user to perform the muscular movement.

2. The dry electrode of claim 1, wherein the one or more processors to which the processed neuromuscular signals are provided are associated with a compute core of a wearable device, the compute core being separate and apart from the dry electrode.

3. The dry electrode of claim 1, wherein the interior surface of the dry electrode is coated with a non-conductive insulating material.

4. The dry electrode of claim 1, wherein:
   the conductive exterior surface is coated with a diamond-like coating (DLC); and at least the conductive exterior surface is made of a material that can be easily elastically deformed by physical forces at room temperature.

5. The dry electrode of claim 4 wherein the material is a conductive polymer.

6. The dry electrode of claim 1, wherein one of the one or more electrical signal-processing components is coupled to a first printed circuit board (PCB), the first PCB being housed within the volume of space that is defined by the interior surface of the dry electrode.

7. The dry electrode of claim 6, wherein:
   another one of the one or more signal-processing components is coupled to a second PCB that is distinct from the first PCB, and the first PCB and the second PCB are stacked vertically within the volume of space that is defined by the interior surface of the dry electrode.

8. The dry electrode of claim 1, wherein:
the sealing layer comprises a PCB to seal the volume of space, and
the PCB is configured to communicatively couple at least some of the one or more electrical signal-processing components with the one or more processers.

9. The dry electrode of claim 8, wherein:
the PCB includes a first terminal that is used by the one or more electrical signal-processing components that are housed within the volume of space defined by the interior surface of the dry electrode to provide the processed neuromuscular signals to the one or more processors.

10. The dry electrode of claim 9, wherein the processed neuromuscular signals are one of (a) buffered signals, (b) buffered and filtered signals, (c) buffered, filtered, and amplified signals, or (d) buffered, filtered, amplified, and digitized signals.

11. The dry electrode of claim 9, wherein the PCB includes a second terminal, distinct from the first terminal, configured to ground one or more of the one or more electrical signal-processing components that are housed within the volume of space defined by the interior surface of the dry electrode and the sealing layer.

12. The dry electrode of claim 11, wherein the PCB includes a third terminal, distinct from the first and second terminals, configured to connect one or more of the one or more electrical signal-processing components to a power source.

13. The dry electrode of claim 8, wherein:
the PCB includes a first terminal that is used by the one or more electrical signal- processing components that are housed within the volume of space defined by the interior surface of the dry electrode to provide the processed neuromuscular signals to the one or more processors; and
the processed neuromuscular signals are one of (a) buffered signals, (b) buffered and filtered signals, (c) buffered, filtered, and amplified signals, or (d) buffered, filtered, amplified, and digitized signals.

14. The dry electrode of claim 1, wherein the conductive exterior surface has a contact area of at least 25 millimeters squared ($mm^2$) and less than 100 $mm^2$.

15. The dry electrode of claim 1, wherein the one or more processors to which the processed neuromuscular signals are provided are associated with a compute core of a wearable device, the compute core being separate and apart from the dry electrode.

16. The dry electrode of claim 1, wherein the interior surface of the dry electrode is coated with a non-conductive insulating material.

17. The dry electrode of claim 1, wherein:
one of the one or more electrical signal-processing components is coupled to a first printed circuit board (PCB), the first PCB being housed within the volume of space that is defined by the interior surface of the dry electrode; and
another one of the one or more signal-processing components is coupled to a second PCB that is distinct from the first PCB, and the first PCB and the second PCB are stacked vertically within the volume of space that is defined by the interior surface of the dry electrode.

18. The dry electrode of claim 1, wherein the conductive exterior surface has a contact area of at least 25 millimeters squared ($mm^2$) and less than 100 $mm^2$.

19. A wearable device, comprising a band, the band including a plurality of dry electrodes configured to sensor neuromuscular signals, each of the plurality of dry electrodes comprising:
a conductive exterior surface configured to contact skin of a user to receive one or more neuromuscular signals, the one or more neuromuscular signals configured to cause the user to perform a muscular movement;
an interior surface disposed opposite to the conductive exterior surface, wherein the interior surface defines a volume of space configured to house one or more electrical signal-processing components; and
a sealing layer configured to encapsulate the one or more electrical signal-processing components, wherein
the one or more electrical signal-processing components are configured to process the one or more neuromuscular signals to produce one or more processed neuromuscular signals; and
the one or more electrical signal-processing components are also configured to provide the processed neuromuscular signals to one or more processors to allow, in part, the one or more processors to detect an intention of the user to perform the muscular movement.

20. A method of manufacturing a dry electrode, comprising:
forming a conductive exterior surface configured to contact skin of a user to receive one or more neuromuscular signals, the one or more neuromuscular signals configured to cause the user to perform a muscular movement;
forming an interior surface disposed opposite to the conductive exterior surface, wherein the interior surface defines a volume of space configured to house one or more electrical signal-processing components; and
forming a sealing layer configured to encapsulate the one or more electrical signal-processing components, wherein:
the one or more electrical signal-processing components are configured to process the one or more neuromuscular signals to produce one or more processed neuromuscular signals; and
the one or more electrical signal-processing components are also configured to provide the processed neuromuscular signals to one or more processors to allow, in part, the one or more processors to detect an intention of the user to perform the muscular movement.

* * * * *